(12) United States Patent
Kim et al.

(10) Patent No.: US 11,667,751 B2
(45) Date of Patent: *Jun. 6, 2023

(54) BIODEGRADABLE POLYESTER RESIN, PREPERATION METHOD THEREOF, AND BIODEGRADABLE POLYESTER FILM COMPRISING THE SAME

(71) Applicant: Ecovance Co. Ltd., Gyeonggi-do (KR)

(72) Inventors: Kyung Youn Kim, Gyeonggi-do (KR); Hoon Kim, Gyeonggi-do (KR); Seong Dong Kim, Gyeonggi-do (KR); Ji Yeon Ryu, Gyeonggi-do (KR); Hyung Mo Kim, Gyeonggi-do (KR)

(73) Assignee: ECOVANCE CO. LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,532

(22) Filed: May 25, 2022

(65) Prior Publication Data

US 2022/0389154 A1    Dec. 8, 2022

(30) Foreign Application Priority Data

May 25, 2021    (KR) .......................... 10-2021-0067190

(51) Int. Cl.
| | | |
|---|---|---|
| *C08G 63/183* | (2006.01) | |
| *C08J 5/18* | (2006.01) | |
| *C08L 1/04* | (2006.01) | |
| *C08L 1/12* | (2006.01) | |

(52) U.S. Cl.
CPC .............. *C08G 63/183* (2013.01); *C08J 5/18* (2013.01); *C08L 1/04* (2013.01); *C08L 1/12* (2013.01); *C08G 2230/00* (2013.01); *C08L 2203/16* (2013.01)

(58) Field of Classification Search
CPC .. C08G 63/183; C08G 2230/00; C08G 63/00; C08J 5/18; C08L 1/04
USPC ................................ 528/190, 193, 194, 308
See application file for complete search history.

(56) References Cited

U.S. PATENT DOCUMENTS

| | | |
|---|---|---|
| 2001/0007899 A1 | 7/2001 | Chung et al. |
| 2006/0142536 A1 | 6/2006 | Chen et al. |
| 2020/0223980 A1 | 7/2020 | Riesen et al. |

FOREIGN PATENT DOCUMENTS

| | | |
|---|---|---|
| CN | 1807485 A | 7/2006 |
| CN | 103483522 A | 1/2014 |
| CN | 104672825 A | 6/2015 |
| JP | H8-208561 A | 8/1996 |
| JP | 2000-001533 A | 1/2000 |
| JP | 2003-128598 A | 5/2003 |
| JP | 2006-176783 A | 7/2006 |
| JP | 2016-094538 A | 5/2016 |
| JP | 2019-043977 A | 3/2019 |
| JP | 2020-528466 A | 9/2020 |
| KR | 10-2001-0055721 A | 7/2001 |
| KR | 10-2012-0103158 A | 9/2012 |
| KR | 10-2021-0057244 A | 5/2021 |

OTHER PUBLICATIONS

Office Action issued by the Korean Intellectual Property Office dated Jul. 22, 2021.
Office Action for Japanese Patent Application No. 2022-084825 issued by the Japanese Patent Office dated Jun. 28, 2022.
Extended European Search Report for the European Patent Application No. 22175535.8 issued by the European Patent Office dated Sep. 29, 2022.
Office Action for the Chinese Patent Application No. 202210587600.7 issued by the Chinese Patent Office dated Feb. 28, 2023.

*Primary Examiner* — Terressa Boykin
(74) *Attorney, Agent, or Firm* — IP & T Group LLP

(57) ABSTRACT

The present invention relates to a biodegradable polyester resin, in which the first repeat unit comprising a first diol residue and an aromatic dicarboxylic acid residue and the second repeat unit comprising a second diol residue and an aliphatic dicarboxylic acid residue satisfy a ratio of the number of repeat units in a specific range, and the softness index of the resin satisfies a specific range, and to a process for preparing the same. Since the biodegradable polyester resin can provide a biodegradable polyester sheet or film that can be simultaneously enhanced in productivity, processability, and moldability and is excellent in tensile strength, tear strength, and friction coefficient and excellent in biodegradability and water degradability, it can be utilized in more diverse fields.

9 Claims, 1 Drawing Sheet

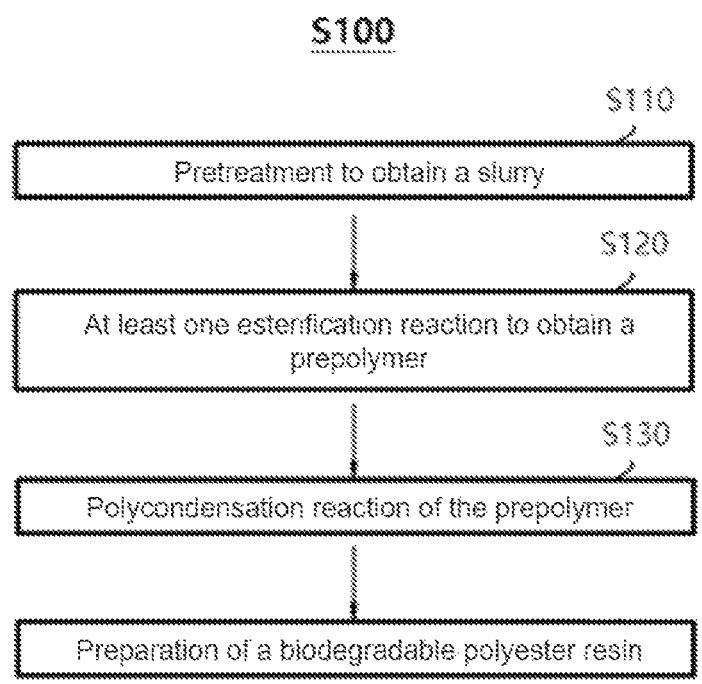

BIODEGRADABLE POLYESTER RESIN, PREPERATION METHOD THEREOF, AND BIODEGRADABLE POLYESTER FILM COMPRISING THE SAME

CROSS-REFERENCE TO RELATED APPLICATION(S)

This application claims benefit of priority to Korean Patent Application No. 10-2021-0067190 filed on May 25, 2021 in the Korean Intellectual Property Office, the disclosure of which is incorporated herein by reference in its entirety.

TECHNICAL FIELD

The present invention relates to a biodegradable polyester resin, to a process for preparing the same, and to a biodegradable polyester film comprising the same.

BACKGROUND ART

In recent years, as concerns about environmental issues have increased, there is a need for a solution to the problem of dealing with various household products, in particular, disposable products. Specifically, since polymeric materials are inexpensive and excellent in such characteristics as processability, they are widely used to manufacture various products such as films, fibers, packaging materials, bottles, containers, and the like; however, they have disadvantages in that when the lifespan of a used product is over, harmful substances are discharged if it is incinerated and that it takes hundreds of years to be completely decomposed naturally depending on the type thereof.

In order to overcome the limitations of these polymers, studies on biodegradable polymers that can be decomposed in a much faster time are being actively conducted. Poly (lactic acid), polybutyleneadipate terephthalate (PBAT), and polybutylene succinate (PBS) are used as biodegradable polymers. When these biodegradable polymers are molded into a blown film, it has severe stickiness and is easily stretched by external forces, whereby the blow moldability becomes poor, or the film surfaces are bonded to each other during winding, resulting in deteriorated processability and productivity; thus, their use is limited.

In order to overcome the physical limitations such as stickiness, a method of adding inorganic substances such as silica or calcium carbonate has been used. However, there has been a problem in that an excessive amount of inorganic substances should be used, thereby forming voids during blow molding, which deteriorates the physical properties such as tensile strength or tear strength and impairs the moldability.

PRIOR ART DOCUMENT

Patent Document (Patent Document 1) Korean Laid-open Patent Publication No. 2012-0103158

DETAILED DESCRIPTION OF THE INVENTION

Technical Problem

An object of the present invention is to provide a polyester resin having excellent physical properties such as stickiness, tensile strength, tear strength, and friction coefficient and excellent moldability and processability, and a process for preparing the same.

Further, another object of the present invention is to provide a biodegradable polyester film prepared from the polyester resin that is excellent in biodegradability and water degradability while achieving excellent physical properties as described above.

Solution to the Problem

The present invention provides a biodegradable polyester resin, which comprises a first repeat unit comprising a first diol residue and an aromatic dicarboxylic acid residue and a second repeat unit comprising a second diol residue and an aliphatic dicarboxylic acid residue, wherein the first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, and the softness index (SI) represented by the following Equation 1 is 90 to 130.

$$\text{Softness index (SI)}=Tc(°\text{C.})/100+VST(°\text{C.}) \qquad \text{[Equation 1]}$$

In Equation 1, Tc and VST are values, exclusive of units, measured for a specimen of the biodegradable polyester film prepared from the biodegradable polyester resin.

Tc is the crystallization temperature (° C.) measured using a differential scanning calorimeter (DSC) while the temperature is elevated from 40° C. to 180° C. at a rate of 10° C./minute and then lowered to −50° C. at a rate of 10° C./minute.

VST is the temperature (° C.) when the tip of a needle passes through 1 mm of a specimen having a thickness of 5 mm and a width of 10 mm while the specimen is measured at 50° C./hour and a load of 10 N according to ASTM D1525.

In addition, the present invention provides a process for preparing a biodegradable polyester resin, which comprises a first step of mixing a diol component and an aromatic dicarboxylic acid and pretreating it to obtain a slurry; a second step of subjecting a mixture comprising the slurry and an aliphatic dicarboxylic acid; or a mixture of a reaction product obtained by esterification of the slurry and an aliphatic dicarboxylic acid to an esterification reaction at least once to obtain a prepolymer; and a third step of subjecting the prepolymer to a polycondensation reaction, wherein the biodegradable polyester resin comprises a first repeat unit comprising a first diol residue and an aromatic dicarboxylic acid residue and a second repeat unit comprising a second diol residue and an aliphatic dicarboxylic acid residue, the first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, and the softness index (SI) represented by the above Equation 1 is 90 to 130.

In addition, the present invention provides a biodegradable polyester film, which comprises a biodegradable polyester resin, wherein the biodegradable polyester resin comprises a first repeat unit comprising a first diol residue and an aromatic dicarboxylic acid residue and a second repeat unit comprising a second diol residue and an aliphatic dicarboxylic acid residue, the first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, and the softness index (SI) represented by the above Equation 1 is 90 to 130.

Advantageous Effects of the Invention

In the biodegradable polyester resin according to an embodiment of the present invention, the first repeat unit comprising a first diol residue and an aromatic dicarboxylic acid residue and the second repeat unit comprising a second diol residue and an aliphatic dicarboxylic acid residue satisfy a ratio of the number of repeat units in a specific range, and the softness index of the resin satisfies a specific range. Thus, it is possible to simultaneously enhance the productivity, processability, and moldability.

Further, since the biodegradable polyester resin can provide a biodegradable polyester sheet or film that has excellent physical properties in terms of excellent tensile strength and tear strength and a low friction coefficient, as well as excellent biodegradability and water degradability, the biodegradable polyester resin can be utilized in more diverse fields to exhibit excellent characteristics.

BRIEF DESCRIPTION OF THE DRAWING

FIG. 1 schematically shows the process of preparing a biodegradable polyester resin according to an embodiment.

BEST MODE FOR CARRYING OUT THE INVENTION

Hereinafter, the present invention will be described in more detail.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

Throughout the present specification, the terms first, second, and the like are used to describe various components. But the components should not be limited by the terms. The terms are used only for the purpose of distinguishing one component from another.

According to an embodiment of the present invention, there is provided a biodegradable polyester resin, which comprises a first repeat unit comprising a first diol residue and an aromatic dicarboxylic acid residue and a second repeat unit comprising a second diol residue and an aliphatic dicarboxylic acid residue, wherein the first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, and the softness index (SI) represented by the following Equation 1 is 90 to 130.

$$\text{Softness index (SI)} = Tc(°\text{C.})/100 + VST(°\text{C.}) \quad \text{[Equation 1]}$$

In Equation 1, Tc and VST are values, exclusive of units, measured for a specimen of the biodegradable polyester film prepared from the biodegradable polyester resin.

Tc is the crystallization temperature (° C.) measured using a differential scanning calorimeter (DSC) while the temperature is elevated from 40° C. to 180° C. at a rate of 10° C./minute and then lowered to −50° C. at a rate of 10° C./minute.

VST is the temperature (° C.) when the tip of a needle passes through 1 mm of a specimen having a thickness of 5 mm and a width of 10 mm while the specimen is measured at 50° C./hour and a load of 10 N according to ASTM D1525.

In general, in the preparation of a biodegradable polyester film, the blown film process is a very important production process. That is, in a blown film process, it is necessary that a bubble is formed well and that a final product is prepared without bonding between the film surfaces during winding. For this purpose, it is important to make the biodegradable polyester resin have an appropriate level of productivity, processability, and moldability, as well as physical properties such as tensile strength, tear strength, and friction coefficient.

Thus, in order to achieve the above characteristics of a biodegradable polyester resin, the structure, softness, or stickiness, crystallization temperature, and softening point temperature of the polyester resin are very important factors.

In an embodiment of the present invention, the biodegradable polyester resin comprises a first repeat unit comprising a first diol residue and an aromatic dicarboxylic acid residue and a second repeat unit comprising a second diol residue and an aliphatic dicarboxylic acid residue, in which the ratio (X/Y) of the number (X) of the first repeat unit to the number (Y) of the second repeat unit is adjusted to a specific range, and the softness index is controlled to a specific range as well, whereby it is possible to simultaneously enhance the productivity, processability, and moldability of the polyester resin and to provide a biodegradable polyester sheet or film that has excellent physical properties in terms of excellent tensile strength and tear strength and a low friction coefficient, as well as excellent biodegradability and water degradability. Further, the technical significance lies in that it can be extended to applications for various injection molding products.

Hereinafter, the biodegradable polyester resin will be described in more detail.

Biodegradable Polyester Resin

The biodegradable polyester resin according to an embodiment of the present invention comprises a first repeat unit comprising a first diol residue and an aromatic dicarboxylic acid residue and a second repeat unit comprising a second diol residue and an aliphatic dicarboxylic acid residue.

The first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, and the aliphatic dicarboxylic acid residue comprises a residue of adipic acid, succinic acid, sebacic acid, or a derivative thereof.

The biodegradable polyester resin having the above structure may enhance the biodegradability, water degradability, and physical properties of a biodegradable polyester sheet, film, or molded article prepared from the same.

The first and second diol residues may each comprise a residue of 1,4-butanediol, 1,2-ethanediol, 1,3-propanediol, or a derivative thereof, specifically, 1,4-butanediol, 1,2-ethanediol, or a derivative thereof, more specifically, 1,4-butanediol or a derivative thereof. For example, in the case where the diols comprise 1,4-butanediol, it may be more advantages for the enhancement in the biodegradability, water degradability, and physical properties of the biodegradable polyester resin or a biodegradable polyester sheet, film, or molded article prepared from the same.

In addition, in the case where the aromatic dicarboxylic acid and the aliphatic dicarboxylic acid each comprise the residues, they can be more uniformly reacted with the diol components according to the preparation process of the present invention, and the reaction efficiency can be increased; thus, it may be advantages for the preparation of a biodegradable polyester resin having the above physical properties.

Specifically, the first and second diol residues may each comprise a residue of 1,4-butanediol or a derivative thereof, the aromatic dicarboxylic acid residue may comprise a residue of terephthalic acid or a derivative thereof, and the aliphatic dicarboxylic acid residue may comprise a residue of adipic acid, succinic acid, or a derivative thereof.

The biodegradable polyester resin may comprise a first repeat unit comprising a residue of 1,4-butanediol or a derivative thereof and a residue of terephthalic acid or a derivative thereof.

Alternatively, the biodegradable polyester resin may comprise a first repeat unit comprising a residue of 1,4-butanediol or a derivative thereof and a residue of dimethyl terephthalate or a derivative thereof.

The biodegradable polyester resin may comprise a second repeat unit comprising a residue of 1,4-butanediol or a derivative thereof and a residue of adipic acid or a derivative thereof.

Alternatively, the biodegradable polyester resin may comprise a second repeat unit comprising a residue of 1,4-butanediol or a derivative thereof and a residue of succinic acid or a derivative thereof.

The biodegradable polyester resin according to an embodiment of the present invention may comprise a first repeat unit comprising a residue of 1,4-butanediol or a derivative thereof and a residue of terephthalic acid or a derivative thereof; and a second repeat unit comprising a residue of 1,4-butanediol or a derivative thereof and a residue of adipic acid or a derivative thereof.

If the first repeat unit and the second repeat unit satisfy the above configuration, it may be more advantageous for providing a biodegradable polyester sheet or film having excellent biodegradability and water degradability.

Meanwhile, in order to provide a biodegradable polyester resin with excellent productivity, processability, and moldability and to simultaneously enhance the biodegradability and water degradability of a biodegradable polyester sheet or film prepared from the same, it is very important to control the number of repeat units that constitute the biodegradable polyester resin.

According to an embodiment of the present invention, the ratio (X/Y) of the number (X) of the first repeat unit to the number (Y) of the second repeat unit may be 0.6 to 1.8.

Specifically, the ratio (X/Y) of the number (X) of the first repeat unit to the number (Y) of the second repeat unit may be 0.7 to 1.8, 0.75 to 1.7, 0.8 to 1.6, 0.8 to 1.5, 0.8 to 1.4, 0.8 to 1.3, 0.8 to 1.2, 0.8 to 1.1, or 0.8 to 1.0.

If the ratio (X/Y) of the number (X) of the first repeat unit to the number (Y) of the second repeat unit is less than the above range, the tensile strength, elongation, and tear strength may be decreased, and the stickiness may be increased, thereby deteriorating the processability. In particular, the blow moldability in a blown film process may be deteriorated, for example, the bubble is not properly shaped, is stretched to one side to be oblique, or bursts. In addition, after 3 months, a biodegradable polyester sheet or film prepared from the biodegradable polyester resin may have a significantly low water degradability reduction rate, so that the biodegradability may be deteriorated under seawater biodegradation or humid conditions.

Specifically, the number of the first repeat unit may be 100 to 900, 300 to 900, 350 to 900, 355 to 900, 360 to 900, 400 to 900, or 450 to 900.

The number of the second repeat unit may be 100 to 1,100, 200 to 1,100, 250 to 1,100, 260 to 1,100, 270 to 1,100, 300 to 1,100, 400 to 1,100, 450 to 1,100, or 450 to 1,080.

If the number of the first repeat unit and the number of the second repeat unit each satisfy the above ranges, it is possible to enhance the processability and physical properties and to further enhance the physical properties, biodegradability, and water degradation reduction rate of a biodegradable polyester sheet, film, or molded article prepared from the same.

In particular, the second repeat unit comprising a second diol residue and an aliphatic dicarboxylic acid residue may change the degree of softness, crystallization temperature, and Vicat softening point of the biodegradable polyester resin depending on the aliphatic dicarboxylic acid residue composed of a linear chain and its content. Thus, as the number of the second repeat unit satisfies the above range, it is possible to further enhance the processability of the biodegradable polyester resin.

In the biodegradable polyester resin according to an embodiment of the present invention, the softness index (SI) represented by the following Equation 1 is 90 to 130.

$$\text{Softness index (SI)} = Tc(°\text{C.})/100 + VST(°\text{C.}) \quad \text{[Equation 1]}$$

In Equation 1, Tc and VST are values, exclusive of units, measured for a specimen of the biodegradable polyester film prepared from the biodegradable polyester resin.

Tc is the crystallization temperature (° C.) measured using DSC while the temperature is elevated from 40° C. to 180° C. at a rate of 10° C./minute and then lowered to −50° C. at a rate of 10° C./minute.

VST is the temperature (° C.) when the tip of a needle passes through 1 mm of a specimen having a thickness of 5 mm and a width of 10 mm while the specimen is measured at 50° C./hour and a load of 10 N according to ASTM D1525.

The softness index (SI) represented by Equation 1 is an index indicating the degree of softness of the biodegradable polyester resin. It stands for the sum of the crystallization temperature (Tc) of the biodegradable polyester resin divided by 100 and the Vicat softening point (VST, Vicat A50) of the biodegradable polyester resin.

The softness index (SI) may be higher as the stickiness is lower, and it may be lower as the stickiness is higher. In addition, the softness index (SI) may be higher as the crystallization temperature (Tc) of the biodegradable polyester resin is higher, and it may be higher as the Vicat softening point (VST, Vicat A50) of the biodegradable polyester resin is higher.

If the softness index (SI) having the above characteristics satisfies an appropriate range, it is possible to simultaneously enhance the physical properties, as well as the productivity, processability, and moldability, of the biodegradable polyester resin.

Specifically, the softness index (SI) of the biodegradable polyester resin may be 90 to 130, 90 to 127, 90 to 126, 90 to 125, 90 to 120, 90 to 116, 90 to 115, 90 to 110, 92 to 110, 93 to 110, 94 to 109, 95 to 109, 97 to 109, 98 to 109, 99 to 109, or 100 to 109. If the softness index (SI) of the biodegradable polyester resin satisfies 90 to 130, it is possible to simultaneously enhance the productivity, processability, and moldability of the biodegradable polyester resin by virtue of appropriate softness and to provide a biodegradable polyester sheet or film with excellent biodegradability and water degradability.

If the softness index (SI) of the biodegradable polyester resin is less than 90, the crystallization temperature (Tc) and/or Vicat softening point (VST, Vicat A50) of the biodegradable polyester resin are too low, which may adversely affect the productivity, processability, and moldability of the biodegradable polyester resin. In particular, the surfaces of the film stick to each other during winding due to severe stickiness, and blow moldability may be deteriorated. In addition, if the softness index (SI) of the biodegradable polyester resin exceeds 130, physical properties such as tensile strength, tear strength, and elongation may be deteriorated, and blow moldability may be deteriorated.

The crystallization temperature (Tc) of the biodegradable polyester resin is measured using DSC in the course of cooling in the following procedure in which the temperature is elevated from 40° C. to 180° C. at a rate of 10° C./minute, isothermal is performed for 5 minutes to remove the thermal history, the temperature is then lowered to −50° C. at a rate of 10° C./minute, and isothermal is performed for 5 minutes.

The crystallization temperature (Tc) of the biodegradable polyester resin may be 38° C. or higher, for example, 38° C. to 70° C., for example, 38° C. to 65° C., for example, 39° C. to 60° C., for example, 40° C. to 60° C., for example, 44° C. to 60° C., for example, 44° C. to 59° C., for example, 44° C. to 58° C., for example, 45° C. to 58° C., for example, 44° C. to 55° C., or, for example, 47° C. to 58° C.

If the crystallization temperature (Tc) of the biodegradable polyester resin satisfies the above range, the crystallization rate and degree of crystallinity are appropriate, so that cooling crystallization is performed quickly after extrusion in the blown film process. Thus, it is possible to stably form a blown film with low stickiness, which may be advantageous from the viewpoint of bubble stability.

The Vicat softening point (VST, Vicat A50) of the biodegradable polyester resin is the temperature (° C.) measured when the tip of a needle passes through 1 mm of a chip (specimen) having a thickness of 5 mm and a width of 10 mm while the specimen is measured at 50° C./hour and a load of 10 N according to ASTM D1525 (ISO 306). It may stand for the degree of softening of the biodegradable polyester resin.

The Vicat softening point (VST, Vicat A50) of the biodegradable polyester resin may be 90° C. or higher, for example, 90° C. to 130° C., for example, 90° C. to 128° C., for example, 90° C. to 126° C., for example, 90° C. to 125° C., for example, 90° C. to 120° C., for example, 90° C. to 115° C., for example, 90° C. to 114° C., for example, 90° C. to 110° C., for example, 92° C. to 110° C., for example, 93° C. to 110° C., for example, 94° C. to 110° C., for example, 95° C. to 110° C., for example, 96° C. to 109° C., for example, 97° C. to 109° C., or, for example, 100° C. to 108° C.

If the Vicat softening point (VST, Vicat A50) of the biodegradable polyester resin satisfies the above range, it is possible to reduce the stickiness of the biodegradable polyester resin, thereby further enhancing the blow moldability. For example, when a biodegradable polyester film is prepared by extrusion and blow molding, it is extruded at high temperatures to soften the polyester pellets and then melt them. The higher the Vicat softening point (VST, Vicat A50), the higher the melting point and the better the softness characteristics. Thus, if the Vicat softening point (VST, Vicat A50) satisfies the above range, the processability can be enhanced during blown film molding.

Meanwhile, in order to further enhance the effect of the present invention, ΔHmc, which is the melt crystallization enthalpy of the biodegradable polyester resin, may also satisfy a specific range.

The biodegradable polyester resin may have a ΔHmc of 14 J/g or more. Specifically, ΔHmc of the biodegradable polyester resin may be, for example, 14 J/g to 30 J/g, for example, 15 J/g to 30 J/g, for example, 15 J/g to 25 J/g, for example, 15 J/g to 22 J/g, for example, 15 J/g to 20 J/g, or, for example, 15 J/g to 19 J/g. ΔHmc of the biodegradable polyester resin is the melt crystallization enthalpy measured using DSC by the same method as the crystallization temperature (Tc) (° C.) of the biodegradable polyester resin.

If ΔHmc of the biodegradable polyester resin satisfies the above range, the crystallization rate and degree of crystallinity are appropriate, so that cooling crystallization is performed quickly after extrusion in the blown film process. Thus, it is possible to stably form a blown film with low stickiness.

Meanwhile, the biodegradable polyester resin may have a molding index (FI) of 25 to 53 represented by the following Equation 2:

$$\text{Molding index } (FI) = TS/FC \qquad \text{[Equation 2]}$$

In Equation 2, TS and FC are values, exclusive of units, measured for a specimen of a biodegradable polyester sheet prepared from the biodegradable polyester resin.

TS is the tear strength (N/cm) measured using a universal testing machine (UTM) for a specimen that has been made according to KSM 6518-B.

FC is the coefficient of static friction measured by contacting one surface of the specimen with stainless steel (SUS) according to ASTM D1894.

The molding index (FI) represented by Equation 2 is an index indicating the moldability of the biodegradable polyester resin. The blow moldability, injection moldability, or the like may vary depending on the molding index (FI). The molding index (FI) of the biodegradable polyester resin refers to a ratio of the tear strength (TS) of a biodegradable polyester sheet prepared from the biodegradable polyester resin to the coefficient of static friction (FC) of the biodegradable polyester sheet.

The molding index (FI) may be higher as the tear strength of a biodegradable polyester sheet is higher, and it may be higher as the coefficient of static friction of the biodegradable polyester sheet is higher.

The molding index (FI) of the biodegradable polyester resin may be, for example, 28 to 53, for example, 29 to 53, for example, 30 to 53, for example, 30 to 52, for example, 35 to 50, for example, 36 to 50, for example, 38 to 50, for example, 40 to 50, or, for example, 43 to 48.

If the molding index (FI) of the biodegradable polyester resin satisfies 25 to 53, it is possible to further enhance the blow moldability or injection moldability and to simultaneously improve the physical properties of the biodegradable polyester sheet or film.

If the molding index (FI) of the biodegradable polyester resin is less than 25, the physical properties such as tensile strength, tear strength, and elongation of a biodegradable polyester sheet or film may be deteriorated, and blow moldability may be deteriorated. In addition, if the molding index (FI) of the biodegradable polyester resin exceeds 53, it may adversely affect the productivity, processability, and moldability of the biodegradable polyester resin. In particular, the surfaces of the film stick to each other during winding due to severe stickiness, and blow moldability may be deteriorated.

The tear strength (N/cm) representing TS in Equation 2 may be measured using a universal testing machine (UTM, model name 4206-001) of INSTRON for a biodegradable polyester sheet specimen that has been prepared according to KSM 6518-B using the biodegradable polyester resin, and a 2-mm notch has been made in its center. It refers to a ratio of the force applied when the specimen is torn, i.e., the maximum load when it is torn, to the thickness (cm) thereof. The tear strength may refer to tear strength of a biodegradable polyester sheet, film, or polyester molded article, as well as a specimen, prepared from the biodegradable polyester resin.

The tear strength may be 300 N/cm or more, for example, 300 N/cm to 600 N/cm, for example, 300 N/cm to 550 N/cm, for example, 300 N/cm to 500 N/cm, for example, 305 N/cm to 480 N/cm, for example, 310 N/cm to 450 N/cm, for example, 330 N/cm to 450 N/cm, for example, 350 N/cm to 450 N/cm, for example, 360 N/cm to 450 N/cm, or, for example, 360 N/cm to 440 N/cm.

If the tear strength satisfies the above range, it is advantageous for achieving the desired molding index (FI) according to an embodiment of the present invention, so that it is possible to satisfy the productivity, processability, and moldability of the biodegradable polyester resin at the same time.

The coefficient of static friction (FC) representing FC in Equation 2 may be measured using, for example, a friction coefficient tester (QM110CF) of Qmesys. It is a value measured as one surface of a specimen of a biodegradable polyester sheet is brought into contact with stainless steel (SUS) and then slid according to ASTM D1894. The coefficient of static friction is a coefficient, indicating the magnitude of force (friction force) that applies to inhibit the motion acting between the surfaces of two objects when one object begins to start moving along the surface of another object or is being continued to move. It has nothing to do with the size of the contact surface area and may be determined by the characteristics of both surfaces.

The coefficient of static friction is a coefficient of friction when an object begins to slide in a stationary state. That is, it refers to a phenomenon in which, when an external force is applied to make an object stationary on a plane slide, a force in the opposite direction acts on the contact surface to resist. The coefficient of static friction may refer to a coefficient of static friction of a biodegradable polyester sheet, film, or polyester molded article, as well as a specimen, prepared from the biodegradable polyester resin.

The coefficient of static friction (FC) may be lower as the adhesiveness of the biodegradable polyester resin is lower, and it may be higher as the adhesiveness of the biodegradable polyester resin is higher.

The coefficient of static friction (FC) may be less than 10, for example, 3 to less than 10, for example, 3 to 9.8, for example, 4 to 9.8, for example, 4 to 9.5, for example, 5 to 9.5, for example, 6 to 9.5, for example, 7 to 9.5, for example, greater than 8.5 to 9.5, for example, 8.6 to 9.5, for example, 8.5 to 9.4, for example, 8.5 to 9.3, for example, 8.6 to 9.3, for example, 8.8 to 9.3, or, for example, 8.9 to 9.3.

If the coefficient of static friction (FC) satisfies the above range, it is possible to reduce the stickiness of the biodegradable polyester resin, thereby further enhancing the blow moldability.

Meanwhile, the biodegradable polyester resin may have a loss tangent (tan δ) of greater than 1 represented by the following Equation 3:

$$\text{Loss tangent (tan δ)} = G''/G' \qquad \text{[Equation 3]}$$

In Equation 3, G' is the storage modulus of a biodegradable polyester sheet prepared from the biodegradable polyester resin at 240° C. and a frequency of 5 rad/s in dynamic viscoelasticity measurement, and G'' is the loss modulus of the biodegradable polyester sheet prepared from the biodegradable polyester resin at 240° C. and a frequency of 5 rad/s in dynamic viscoelasticity measurement.

Here, the storage modulus and loss modulus of the polyester sheet may refer to the storage modulus and loss modulus of the polyester resin.

To determine the loss tangent (tan δ) of the biodegradable polyester resin, the biodegradable polyester resin is formed into a sheet, the storage modulus and loss modulus thereof are then measured using a rheometrics dynamic spectrometer (RDS, TA Instrument, Discovery HR 30), and it is calculated using the above Equation 3.

That is, the loss tangent (tan δ) of the biodegradable polyester resin is a ratio of the loss modulus (G'') of the biodegradable polyester resin to the storage modulus (G') of the biodegradable polyester resin. If the value of the loss modulus (G'') of the biodegradable polyester resin is greater than the value of the storage modulus (G') of the biodegradable polyester resin, the loss tangent (tan δ) of the biodegradable polyester resin represented by the above Equation 3 may be greater than 1.

Specifically, the loss tangent (tan δ) of the biodegradable polyester resin may be, for example, 1.05 to 1.30, for example, 1.05 to 1.25, for example, 1.08 to 1.25, for example, 1.10 to 1.25, for example, 1.10 to 1.20, or, for example, 1.15 to 1.19.

If the loss tangent (tan δ) of the biodegradable polyester resin satisfies the above range, it is possible to enhance the productivity, processability, and moldability of the biodegradable polyester resin at the same time. Further, the biodegradable polyester resin can provide a biodegradable polyester sheet or film that can achieve excellent physical properties in terms of excellent tensile strength and tear strength and a low friction coefficient and that is excellent in biodegradability and water degradability.

The storage modulus (G') of the biodegradable polyester resin may be measured after the biodegradable polyester resin is formed into a sheet, in which event it may be, for example, 200,000 dyne/cm$^2$ to 400,000 dyne/cm$^2$, for example, 200,000 dyne/cm$^2$ to 380,000 dyne/cm$^2$, for example, 200,000 dyne/cm$^2$ to 360,000 dyne/cm$^2$, for example, 200,000 dyne/cm$^2$ to 350,000 dyne/cm$^2$, or for example, 200,000 dyne/cm$^2$ to 330,000 dyne/cm$^2$.

The loss modulus (G'') of the biodegradable polyester resin may be measured after the biodegradable polyester resin is formed into a sheet, in which event it may be, for example, 220,000 dyne/cm$^2$ to 450,000 dyne/cm$^2$, for example, 220,000 dyne/cm² to 400,000 dyne/cm², for example, 230,000 dyne/cm² to 390,000 dyne/cm², for example, 240,000 dyne/cm² to 380,000 dyne/cm², or, for example, 240,000 dyne/cm² to 370,000 dyne/cm².

If the storage modulus (G') and the loss modulus (G") of the biodegradable polyester resin each satisfy the above ranges, it is possible to enhance the processability and physical properties and to enhance the biodegradability and water degradation reduction rate of a biodegradable polyester sheet or film prepared from the same.

Meanwhile, a biodegradable polyester sheet prepared from the biodegradable polyester resin may have a tensile strength of 30 MPa or more.

The tensile strength may be measured using a universal testing machine (UTM, model name 4206-001) of INSTRON in which a biodegradable polyester sheet specimen is prepared according to KSM D638 V using the biodegradable polyester resin, a test is performed at a tensile speed of 100 mm/minute, and it is measured by the program built in the equipment.

The tensile strength may be, for example, 30 MPa to 50 MPa, for example, 30 MPa to 49 MPa, for example, 30 MPa to 48 MPa, for example, 32 MPa to 48 MPa, for example, 33 MPa to 48 MPa, for example, 34 MPa to 48 MPa, for example, 35 MPa to 49 MPa, for example, 35 MPa to 48 MPa, for example, 35 MPa to 47 MPa, or, for example, 35 MPa to 46 MPa.

If the tensile strength satisfies the above range, it is possible to enhance the productivity, processability, and moldability of the biodegradable polyester resin at the same time.

Meanwhile, a biodegradable polyester sheet prepared from the biodegradable polyester resin may have an elongation of 200% or more.

The elongation may be, for example, 200% to 900%, for example, 200% to 800%, for example, 200% to 600%, for example, 200% to 500%, or, for example, 250% to 400%.

Meanwhile, a biodegradable polyester film comprising the biodegradable polyester resin may have a biodegradability of 90% or more as measured by the amount of carbon dioxide generated according to KS M3100-1 and a water degradability reduction rate represented by the following Equation 4 of 85% or more:

$$\text{Water degradability reduction rate}(\%) = \frac{Mn_A - Mn_B}{Mn_A} \times 100 \quad \text{[Equation 4]}$$

In Equation 4, $Mn_A$ and $Mn_B$ are each a number average molecular weight of a biodegradable polyester sheet prepared from the biodegradable polyester resin as measured using gel permeation chromatography (GPC) in which the biodegradable polyester sheet is immersed in water and subjected to water degradation acceleration at 80° C. in a hot air oven.

$Mn_A$ is the initial number average molecular weight of a biodegradable polyester sheet, and $Mn_B$ is the number average molecular weight of the biodegradable polyester sheet after 3 months of the water degradation acceleration.

Here, the water degradation acceleration refers to immersing a biodegradable polyester sheet in water and subjecting it to hydrolysis at a temperature of 80° C.

The water degradability reduction rate may be calculated by measuring the initial number average molecular weight of a biodegradable polyester sheet and the number average molecular weight thereof after 3 months of the water degradation acceleration. That is, the water degradability reduction rate of the biodegradable polyester sheet is represented as a ratio in percentage of the difference between the initial number average molecular weight of the biodegradable polyester sheet and the number average molecular weight of the biodegradable polyester sheet after three months to the initial number average molecular weight as represented by the above Equation 4 measured using gel permeation chromatography (GPC).

The water degradability reduction rate of the biodegradable polyester sheet may be 85% or more, 86% or more, 87% or more, 88% or more, 89% or more, 90% or more, or 91% or more.

If the water degradability reduction rate of the biodegradable polyester sheet satisfies the above range, biodegradation may be possible under seawater biodegradation or humid conditions.

The initial number average molecular weight ($Mn_A$) of the biodegradable polyester sheet may be 40,000 g/mole or more, 40,000 g/mole to 80,000 g/mole, 40,000 g/mole to 70,000 g/mole, for example, 40,000 g/mole to 65,000 g/mole, or 50,000 g/mole to 60,000 g/mole.

The number average molecular weight ($Mn_B$) of the biodegradable polyester sheet measured after the biodegradable polyester sheet that has been immersed in water at 80° C. is subjected to water degradation acceleration for 3 months may be 5,000 g/mole or less, 4,900 g/mole or less, 4,800 g/mole or less, 4,600 g/mole or less, or 4,500 g/mole or less. The number average molecular weight ($Mn_B$) of the biodegradable polyester sheet measured after the biodegradable polyester sheet that has been immersed in water at 80° C. is subjected to water degradation acceleration for 3 months may be, for example, 3,000 g/mole to 5,000 g/mole, 3,500 g/mole to 5,000 g/mole, 3,800 g/mole to 4,800 g/mole, or 4,000 g/mole to 4,600 g/mole.

If the initial number average molecular weight ($Mn_A$) and the number average molecular weight ($Mn_B$) of the biodegradable polyester sheet after water degradation acceleration for three months each satisfy the above ranges, the water degradability reduction rate of the biodegradable polyester sheet may satisfy the above range, whereby biodegradation may be possible under seawater biodegradation or humid conditions.

The structure and physical properties of the biodegradable polyester resin according to an embodiment of the present invention can be efficiently achieved by using the process for preparing a biodegradable polyester resin according to an embodiment of the present invention.

Hereinafter, the process for preparing a biodegradable polyester resin will be described in detail.

Process for Preparing a Biodegradable Polyester Resin

According to an embodiment of the present invention, there is provided a process for preparing a biodegradable polyester resin, which comprises a first step of mixing a diol component and an aromatic dicarboxylic acid and pretreating it to obtain a slurry; a second step of subjecting a mixture comprising the slurry and an aliphatic dicarboxylic acid; or a mixture of a reaction product obtained by esterification of the slurry and an aliphatic dicarboxylic acid to an esterification reaction at least once to obtain a prepolymer; and a third step of subjecting the prepolymer to a polycondensation reaction, wherein the biodegradable polyester resin comprises a first repeat unit comprising a first diol residue and an aromatic dicarboxylic acid residue and a second repeat unit comprising a second diol residue and an aliphatic dicarboxylic acid residue, the first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, and the softness index (SI) represented by the following Equation 1 is 90 to 130.

According to an embodiment of the present invention, in the process for preparing a biodegradable polyester resin, a diol component and an aromatic dicarboxylic acid are mixed and pretreated to obtain a slurry; the slurry is subjected to an esterification reaction to obtain a prepolymer; and the prepolymer is subjected to a polycondensation reaction to effectively achieve the desired structure and physical properties of the biodegradable polyester resin according to an embodiment of the present invention.

Referring to FIG. 1, the process for preparing a biodegradable polyester resin (S100) comprises a first step (S110) of mixing a diol component and an aromatic dicarboxylic acid and pretreating it to obtain a slurry.

That is, the first step is a pretreatment step before the esterification reaction, in which step a diol component and an aromatic dicarboxylic acid are mixed and formed into a slurry.

As a diol component and an aromatic dicarboxylic acid are mixed and pretreated to form a slurry, the diol component and the aromatic dicarboxylic acid can be uniformly reacted, and it is effective for expediting the esterification reaction, whereby the reaction efficiency can be increased.

In particular, if an aromatic dicarboxylic acid such as terephthalic acid has complete crystallinity and is in a powder form, its solubility in the diol is very low, whereby it may be difficult to carry out a homogeneous reaction. Thus, the pretreatment step of forming a slurry may play a very important role in providing a biodegradable polyester resin, sheet, and film having excellent physical properties according to an embodiment of the present invention and enhancing the reaction efficiency.

In addition, in the case where all of a diol component, an aromatic dicarboxylic acid, and an aliphatic dicarboxylic acid are mixed and subjected to an esterification reaction, without the step of mixing and pretreating the diol component and the aromatic dicarboxylic acid, the reaction of the diol component and the aliphatic dicarboxylic acid may be preferentially carried out. Thus, it may be difficult to achieve a biodegradable polyester resin that satisfies the ratio of the number between the first repeat unit and the second repeat unit as desired in the present invention.

According to an embodiment of the present invention, in the case where the aromatic dicarboxylic acid is terephthalic acid, terephthalic acid is a white crystal that has perfect crystallinity and sublimes at around 300° C. under normal pressure without a melting point, and it has a very low solubility in the diol, making it difficult to carry out a homogeneous reaction. In the case where the pretreatment step is performed before the esterification reaction, a uniform reaction can be induced by increasing the surface area thereof for reacting with the diol in the solid matrix of terephthalic acid.

In addition, according to an embodiment of the present invention, in the case where the aromatic dicarboxylic acid is dimethyl terephthalate, dimethyl terephthalate may be made into a molten state at about 142° C. to 170° C. by the pretreatment step and reacted with the diol. Thus, it is possible to carry out the esterification reaction more quickly and efficiently.

Meanwhile, in the pretreatment process of the first step, the structure and physical properties of the biodegradable polyester resin may vary depending on the particle size, particle size distribution, pretreatment reaction conditions, and the like of the aromatic dicarboxylic acid.

For example, the aromatic dicarboxylic acid may comprise terephthalic acid, and the terephthalic acid may have an average particle diameter (D50) of 10 μm to 400 μm in a particle size distribution (PSD) measured by a particle size analyzer Microtrac S3500 and a standard deviation of the average particle diameter (D50) of 100 or less. The standard deviation refers to the square root of variance.

The average particle diameter (D50) of terephthalic acid may be, for example, 20 μm to 200 μm, for example, 30 μm to 180 μm, for example, 50 μm to 150 μm, or, for example, 50 μm to 100 μm. If the average particle diameter (D50) of terephthalic acid satisfies the above range, it may be more advantageous in terms of solubility enhancement in diols and reaction rate.

If the average particle diameter (D50) of terephthalic acid is less than 10 μm, the average particle diameter is too small, so that primary particles may be undesirably converted to agglomerated secondary particles. If the average particle diameter (D50) of terephthalic acid exceeds 400 μm, the average particle diameter is too large, so that the solubility in diols is reduced, thereby lowering the reaction rate, and it may be difficult to achieve a homogenization reaction.

In addition, the standard deviation of the average particle diameter (D50) may be 100 or less, for example, 5 to 90, for example, 5 to 80, for example, 5 to 70, for example, 10 to 70, for example, 15 to 70, or, for example, 20 to 70. If the standard deviation of the average particle diameter (D50) satisfies the above range, it may be more advantageous in terms of solubility enhancement in diols and reaction rate.

Further, if the average particle diameter (D50) and the standard deviation thereof satisfy the above ranges, the reaction time can be shortened by 1.5 times or more, so that it may be preferable in terms of reaction efficiency.

In the case where the aromatic dicarboxylic acid is dimethyl terephthalate, it may be used in a molten state, or it, when measured in a particle state, may have an average particle diameter (D50) and a standard deviation thereof similar to those of terephthalic acid.

In the pretreatment process of the first step, the diol and the aromatic dicarboxylic acid may be mixed and put into a slurry agitator (tank).

According to an embodiment of the present invention, in the pretreatment process of the first step, the agitating force until the slurry is formed is very important; thus, the number and shape of agitating blades of the agitator and the conditions for forming the slurry are very important.

It may be more advantageous for producing an efficient agitating effect that the slurry agitator is, for example, an anchor type at the bottom, has a height to the agitator of 20 mm or more, and has two or more rotor blades.

For example, the slurry agitator may have a height to the agitator of 20 mm or more. That is, the reactor and the bottom of the agitator are almost contiguous with each other. In such a case, a slurry without precipitation may be obtained. If the number and shape of the agitator and the rotor blades do not satisfy the above conditions, when the diol and the aromatic dicarboxylic acid are initially mixed, the aromatic dicarboxylic acid may settle to the bottom, thereby causing phase separation.

The pretreatment process of the first step may comprise mixing the diol component and the aromatic dicarboxylic acid and agitating the mixture at 60° C. to 100° C. and 50 rpm to 200 rpm for 10 minutes or longer, for example, 10 minutes to 200 minutes. If the pretreatment process satisfies the above temperature, speed, and agitation time, a homogeneous slurry can be obtained without phase separation, which is advantageous in terms of reaction efficiency, and the physical properties of the biodegradable polyester resin desired in the present invention can be efficiently obtained.

The diol component may comprise 1,4-butanediol, 1,2-ethanediol, 1,3-propanediol, or a derivative thereof.

Specifically, the diol component may comprise 1,4-butanediol, 1,2-ethanediol, 1,3-propanediol, or a derivative thereof in an amount of 95% by mole or more, 98% by mole or more, 99% by mole or more, or 100% by mole, based on the total number of moles of the diol component. As the diol component comprises 1,4-butanediol, 1,2-ethanediol, 1,3-propanediol, or a derivative thereof in the above amount, it is possible to enhance the biodegradability, water degradability, and physical properties of the biodegradable polyester resin or a biodegradable polyester sheet, film, or molded article prepared from the same.

The diol component may be added at once or dividedly. For example, the diol component may be added dividedly at the time of mixing with the aromatic dicarboxylic acid and mixing with the aliphatic dicarboxylic acid.

The aromatic dicarboxylic acid may comprise one or more selected from the group consisting of terephthalic acid, dimethyl terephthalate, and a derivative thereof. Specifically, the aromatic dicarboxylic acid may be terephthalic acid or dimethyl terephthalate.

In addition, the aromatic dicarboxylic acid component may be used in an amount of 40% by mole to 60% by mole, 42% by mole to 58% by mole, 44% by mole to 58% by mole, 44% by mole to 57% by mole, 44% by mole to 55% by mole, 44% by mole to 53% by mole, 46% by mole to 52% by mole, 48% by mole to 52% by mole, or 50% by mole to 52% by mole, based on the total number of moles of the dicarboxylic acid component.

If the molar ratio of the aromatic dicarboxylic acid is controlled to the above range, it is more advantageous for producing the effects of the present invention and to enhance the physical properties, biodegradability, and water degradation reduction rate of a biodegradable polyester sheet, film, or molded article prepared from the same.

Referring back to FIG. 1, the process for preparing a biodegradable polyester resin comprises a second step (S120) of subjecting a mixture comprising the slurry and an aliphatic dicarboxylic acid; or a mixture of a reaction product obtained by esterification of the slurry and an aliphatic dicarboxylic acid to an esterification reaction at least once to obtain a prepolymer.

In the esterification reaction of the second step, the reaction time may be shortened by using the slurry obtained in the first step. For example, the reaction time may be shortened by 1.5 times or more by using the slurry obtained in the first step.

The esterification reaction of the second step may be carried out at least once.

According to an embodiment of the present invention, in the esterification reaction, an aliphatic dicarboxylic acid, or a diol and an aliphatic dicarboxylic acid, may be added to the slurry to carry out the esterification reaction once.

The esterification reaction may be carried out at 250° C. or lower for 0.5 hour to 5 hours. Specifically, the esterification reaction may be carried out at atmospheric pressure or a reduced pressure at 180° C. to 250° C., 185° C. to 240° C., or 200° C. to 240° C., until water as a by-product theoretically reaches 95%. For example, the esterification reaction may be carried out for 0.5 hour to 4.5 hours, 0.5 hour to 3.5 hours, or 1 hour to 3 hours, but it is not limited thereto.

The prepolymer may have a number average molecular weight of 500 to 10,000 g/mole. For example, the number average molecular weight of the prepolymer may be 500 to 8,500 g/mole, 500 to 8,000 g/mole, 500 to 7,000 g/mole, 500 to 5,000 g/mole, or 500 to 2,000 g/mole. As the number average molecular weight of the prepolymer satisfies the above range, it is possible to efficiently increase the molecular weight of the polymer in the polycondensation reaction.

According to another embodiment of the present invention, the esterification reaction may be carried out two or more times as a step of subjecting the slurry to a first esterification reaction; and a step of adding an aliphatic dicarboxylic acid, or a diol and an aliphatic dicarboxylic acid, to the product of the first esterification reaction and carrying out a second esterification reaction.

In the case where the esterification reaction is carried out two or more times, it is possible to enhance the reaction stability and reaction uniformity as compared with the case where the esterification reaction is carried out once, and the desired ratio of the number of the first repeat unit to the number of the second repeat unit can be adjusted, leading to an advantage in that the effect according to an embodiment of the present invention can be efficiently produced.

The first esterification reaction and the second esterification reaction may each be carried out at 250° C. or lower for 0.5 hour to 5 hours. Specifically, the first esterification reaction and the second esterification reaction may each be carried out at atmospheric pressure and 180° C. to 250° C., 185° C. to 240° C., or 200° C. to 240° C., until water as a by-product theoretically reaches 95%. For example, the first esterification reaction and the second esterification reaction may each be carried out for 0.5 hour to 4.5 hours, 0.5 hour to 3.5 hours, or 1 hour to 3 hours, but it is not limited thereto.

The prepolymer may have a number average molecular weight of 500 to 10,000 g/mole. For example, the number average molecular weight of the prepolymer may be 500 to 8,500 g/mole, 500 to 7,000 g/mole, 1,000 to 6,000 g/mole, or 2,500 to 5,500 g/mole. As the number average molecular weight of the prepolymer satisfies the above range, it is possible to efficiently increase the molecular weight of the polymer in the polycondensation reaction, thereby further enhancing the strength characteristics.

The number average molecular weight may be measured using gel permeation chromatography (GPC). Specifically, various data such as Mn, Mw, and Mp may be obtained by gel permeation chromatography. The molecular weight may be measured as a number average molecular weight (Mn) among them.

The aliphatic dicarboxylic acid component may comprise adipic acid, succinic acid, sebacic acid, or a derivative thereof. Specifically, the aliphatic dicarboxylic acid component may comprise adipic acid or succinic acid.

In addition, the aliphatic dicarboxylic acid component may be used in an amount of 40% by mole to 60% by mole, 42% by mole to 58% by mole, 42% by mole to 56% by mole, 43% by mole to 56% by mole, 45% by mole to 56% by mole, 47% by mole to 56% by mole, 48% by mole to 54% by mole, 48% by mole to 52% by mole, or 48% by mole to 50% by mole, based on the total number of moles of the dicarboxylic acid component.

If the molar ratio of the aliphatic dicarboxylic acid is controlled to the above range, it is possible to simultaneously enhance the productivity, processability, and moldability of the biodegradable polyester resin and to enhance the physical properties, biodegradability, and water degradability of a biodegradable polyester sheet, film, or molded article prepared from the same.

In particular, since the aliphatic dicarboxylic acid component is composed of a linear chain, it may have an impact on the stickiness of the biodegradable polyester resin.

Specifically, if the content of the aliphatic dicarboxylic acid component is excessive, the stickiness of the biodegradable polyester resin may be increased, thereby reducing the processability.

In the second step, nanocellulose may be further added at the time of the esterification reaction, for example, if the first and second esterification reactions are carried out, at the time of the first esterification reaction, the second esterification reaction, or both.

Specifically, in the case where the esterification reaction is carried out once, nanocellulose may be further added at the time of the esterification reaction, for example, at the time when an aliphatic dicarboxylic acid is, or a diol and an aliphatic dicarboxylic acid are, added.

In addition, in the case where the esterification reaction is carried out two or more times, nanocellulose may be added at the time of the first esterification reaction, the second esterification reaction, or both. For example, nanocellulose may be added at the time of the second esterification reaction, that is, at the time when an aliphatic dicarboxylic acid is, or a diol and an aliphatic dicarboxylic acid are, added, or at the initial stage of the esterification reaction. In such a case, the nanocellulose may be efficiently dispersed. In particular, it is preferable in terms of physical properties such as strength and thermal properties of the biodegradable polyester resin to add nanocellulose, and it is possible to enhance the physical properties such as strength and biodegradability of a biodegradable polyester sheet, film, or molded article as well.

The nanocellulose may be one or more selected from the group consisting of cellulose nanocrystal, cellulose nanofiber, microfibrillated cellulose, hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose, and cyclohexyl cellulose.

The nanocellulose may have a diameter of 1 nm to 200 nm. For example, the diameter of the nanocellulose may be 1 nm to 150 nm, 1 nm to 120 nm, 1 nm to 100 nm, 1 nm to 95 nm, 5 nm to 90 nm, 10 nm to 80 nm, 1 nm to 50 nm, 5 nm to 45 nm, 10 nm to 60 nm, 1 nm to 10 nm, 10 nm to 30 nm, or 15 nm to 50 nm.

In addition, the nanocellulose may have a length of 5 nm to 10 μm. For example, the length of the nanocellulose may be 5 nm to 1 μm, 10 nm to 150 nm, 20 nm to 300 nm, 200 nm to 500 nm, 100 nm to 10 μm, 500 nm to 5 μm, 300 nm to 1 μm, or 1 μm to 10 μm.

As the diameter and length of the nanocellulose satisfy the above ranges, it is possible to further enhance the biodegradability and physical properties of the biodegradable polyester resin or a biodegradable polyester sheet, film, or molded article prepared from the same.

In addition, the nanocellulose may be pretreated with a bead mill or pretreated with ultrasound. Specifically, the nanocellulose may be obtained by pretreating nanocellulose dispersed in water with a bead mill or ultrasound.

First, the bead mill pretreatment may be carried out by a vertical mill or a horizontal mill as a wet milling apparatus. The horizontal mill is preferable in that the amount of beads that can be charged inside the chamber is greater, the machine's uneven wear is smaller, the wear of beads is smaller, and the maintenance and repair are convenient, but it is not limited thereto.

The bead mill pretreatment may be carried out using one or more beads selected from the group consisting of zirconium, zircon, zirconia, quartz, and aluminum oxide.

Specifically, the bead mill pretreatment may be carried out using beads having a diameter of 0.3 mm to 1 mm. For example, the diameter of beads may be 0.3 mm to 0.9 mm, 0.4 mm to 0.8 mm, 0.45 mm to 0.7 mm, or 0.45 mm to 0.6 mm. As the diameter of beads satisfies the above range, it is possible to further enhance the dispersibility of the nanocellulose. If the diameter of beads exceeds the above range, the average particle size and particle size deviation of the nanocellulose may increase, which may reduce the dispersibility.

In addition, it is preferable from the viewpoint of transfer of sufficient energy that the bead mill pretreatment is carried out with beads having a specific gravity greater than that of the nanocellulose. For example, the beads may be one or more selected from the group consisting of zirconium, zircon, zirconia, quartz, and aluminum oxide, which have a specific gravity greater than that of the nanocellulose dispersed in water. Zirconium beads having a specific gravity greater than that of the nanocellulose dispersed in water by 4 times or more are preferred, but they are not limited thereto.

In addition, the ultrasound pretreatment is a method of physically crushing or pulverizing nanoparticles with waves generated by emitting ultrasound of 20 kHz into a solution.

The ultrasound pretreatment may be carried out for less than 30 minutes with an energy dose of 30,000 J or less. For example, the ultrasound pretreatment may be carried out for 25 minutes or less, 20 minutes or less, or 18 minutes or less with an energy dose of 25,000 J or less or 22,000 J or less. As the energy dose and the operation time satisfy the above ranges, the effect of the pretreatment with ultrasound, that is, the enhancement in dispersibility can be maximized. If the energy dose exceeds the above range, the nanoparticles may be re-agglomerated, thereby deteriorating the dispersibility.

The nanocellulose according to an embodiment may be pretreated with a bead mill or pretreated with ultrasound. Alternatively, the nanocellulose according to an embodiment may be pretreated with both a bead mill and ultrasound. In such an event, it is preferable that ultrasound pretreatment is carried out after the bead mill pretreatment to prevent re-agglomeration, thereby enhancing the dispersibility.

The biodegradable polyester resin according to an embodiment has a polydispersity index (PDI) of less than 2.0. For example, the polydispersity index of the biodegradable polyester resin may be less than 2.0, 1.95 or less, or 1.9 or less.

As the polydispersity index is adjusted to the above range, the thermal resistance can be further enhanced. Specifically, if the polydispersity index exceeds the above range, the thermal resistance of the biodegradable polyester resin may be deteriorated. Thus, in the process of preparing a molded article such as a film using the biodegradable polyester resin, the rate of degradation of the polymer may be increased, thereby reducing the processability and productivity.

The polydispersity index may be calculated according to the following Equation A.

$$\text{Polydispersity index (PDI)}=M_w/M_n \qquad \text{[Equation A]}$$

In Equation A, Mw is the weight average molecular weight (g/mole) of a resin, and Mn is the number average molecular weight (g/mole) of the resin.

In addition, the content of the nanocellulose may be, for example, 3,000 ppm or less, for example, 2,500 ppm or less, for example, 2,000 ppm or less, 1,800 ppm or less, 1,500 ppm or less, 1,000 ppm or less, 900 ppm or less, 800 ppm or less, 700 ppm or less, 600 ppm or less, 500 ppm or less, or 400 ppm or less, and may be, for example, 100 ppm or more, 150 ppm or more, 200 ppm or more, 250 ppm or more, 300 ppm or more, 400 ppm or more, 500 ppm or more, 600 ppm or more, 800 ppm or more, or 1,000 ppm or more, based on the total weight of the diols, aromatic dicarboxylic acid, and aliphatic dicarboxylic acid. As the content of the nanocellulose satisfies the above range, the biodegradability and physical properties such as strength can be further enhanced.

A titanium-based catalyst or a germanium-based catalyst may be further added to the slurry before the esterification reaction in the second step.

Specifically, in the case where the esterification reaction is carried out once, a titanium-based catalyst or a germanium-based catalyst may be added to the slurry.

In addition, in the case where the esterification reaction is carried out two or more times, a titanium-based catalyst or a germanium-based catalyst may be added to the slurry, the reaction product obtained by the first esterification of the slurry, or both.

Specifically, the biodegradable polyester resin may comprise at least one titanium-based catalyst selected from the group consisting of titanium isopropoxide, antimony trioxide, dibutyltin oxide, tetrapropyl titanate, tetrabutyl titanate, tetraisopropyl titanate, antimony acetate, calcium acetate, and magnesium acetate; or a germanium-based catalyst selected from the group consisting of germanium oxide, germanium methoxide, germanium ethoxide, tetramethyl germanium, tetraethyl germanium, and germanium sulfide.

In addition, the content of the catalyst may be 100 ppm to 1,000 ppm based on the total weight of the diols, aromatic dicarboxylic acid, and aliphatic dicarboxylic acid. For example, the titanium-based catalyst or germanium-based catalyst may be employed in an amount of 100 ppm to 800 ppm, 150 ppm to 700 ppm, 200 ppm to 600 ppm, or 250 ppm to 550 ppm. As the content of the catalyst satisfies the above range, the processability can be further enhanced.

A phosphorus-based stabilizer may be further added during the esterification reaction in the second step, at the end of the esterification reaction, or both.

Specifically, in the case where the esterification reaction is carried out once, a phosphorus-based stabilizer may be added during the esterification reaction, at the end of the esterification reaction, or both.

In addition, in the case where the esterification reaction is carried out two or more times, a phosphorus-based stabilizer may be added during the first esterification reaction, during the second esterification reaction, or both, or at the end of the first esterification reaction or at the end of the second esterification reaction.

Specifically, the biodegradable polyester resin may further comprise at least one stabilizer comprising amine-based high-temperature thermal stabilizers such as tetraethylenepentaamine or phosphorus-based stabilizer selected from the group consisting of phosphoric acid, phosphorous acid, polyphosphoric acid, trimethylphosphate, triethylphosphate, triethylphosphonoacetate, trimethylphosphine, and triphenylphosphine.

In addition, the content of the phosphorus-based stabilizer may be 3,000 ppm or less based on the total weight of the diols, aromatic dicarboxylic acid, and aliphatic dicarboxylic acid. Specifically, the content of the phosphorus-based stabilizer may be, for example, 10 ppm to 3,000 ppm, 20 ppm to 2,000 ppm, 20 ppm to 1,500 ppm, or 20 ppm to 1,000 ppm, based on the total weight of the diols, aromatic dicarboxylic acid, and aliphatic dicarboxylic acid. As the content of the phosphorus-based stabilizer satisfies the above range, it is possible to suppress the degradation of the polymer due to high temperatures during the reaction process, thereby reducing the end groups of the polymer and improving the color.

At least one selected from the group consisting of an additive such as silica, potassium, and magnesium and a color correcting agent such as cobalt acetate may be further added at the end of the esterification reaction of the second step. That is, the additive and/or color correcting agent may be added after completion of the esterification reaction for stabilization, and the polycondensation reaction may then be carried out.

Referring back to FIG. 1, the process for preparing a biodegradable polyester resin (S100) comprises a third step (S130) of subjecting the prepolymer to a polycondensation reaction.

The polycondensation reaction may be carried out at 180° C. to 280° C. and 1.0 Torr or less for 1 hour to 5 hours. For example, the polycondensation reaction may be carried out at 190° C. to 270° C., 210° C. to 260° C., or 230° C. to 255° C., at 0.9 Torr or less, 0.7 Torr or less, 0.2 Torr to 1.0 Torr, 0.3 Torr to 0.9 Torr, or 0.4 Torr to 0.6 Torr, for 1.5 hours to 5 hours, 2 hours to 5 hours, or 2.5 hours to 4.5 hours.

In addition, a titanium-based catalyst or a germanium-based catalyst may be further added to the prepolymer before the polycondensation reaction. In addition, one or more selected from the group consisting of an additive such as silica, potassium, and magnesium; a stabilizer such as trimethyl phosphate, triphenyl phosphate, trimethyl phosphine, phosphoric acid, phosphorous acid, and an amine-based stabilizer such as tetraethylenepentaamine; and a polymerization catalyst such as antimony trioxide and tetrabutyl titanate may be further added to the prepolymer before the polycondensation reaction.

The polymer may have a number average molecular weight of 40,000 g/mole or more. For example, the number average molecular weight of the polymer may be 43,000 g/mole or more, 45,000 g/mole or more, or 50,000 g/mole to 70,000 g/mole. As the number average molecular weight of the polymer satisfies the above range, the physical properties and processability can be further enhanced.

Thereafter, pellets may be prepared from the polymer.

Specifically, the polymer may be cooled to 15° C. or lower, 10° C. or lower, or 6° C. or lower, and the cooled polymer may then be cut to prepare pellets.

The cutting step may be carried out using a pellet cutter without limitations as long as it is commonly used in the art, and the pellets may have various shapes. Examples of the pellet cutting method may include an underwater cutting method or a strand cutting method.

Biodegradable Polyester Sheet

Meanwhile, in an embodiment of the present invention, a biodegradable polyester sheet may be prepared from the biodegradable polyester resin.

For example, the biodegradable polyester sheet may be prepared using the biodegradable polyester resin or polyester resin pellets.

Specifically, the polyester resin prepared above is put in, for example, a stainless steel (SUS) mold and maintained at about 150 to 300° C. under a pressure of 5 to 20 MPa for 1 minute to 30 minutes using a hot press. It is then taken out and immediately cooled at 18° C. to 25° C. in water for about 10 seconds to 5 minutes to obtain a biodegradable polyester sheet.

Biodegradable Polyester Film

In an embodiment, the present invention may provide a biodegradable polyester film, which comprises a biodegradable polyester resin, wherein the biodegradable polyester resin comprises a first repeat unit comprising a first diol residue and an aromatic dicarboxylic acid residue and a second repeat unit comprising a second diol residue and an aliphatic dicarboxylic acid residue, the first and second diol residues each comprise a residue of 1,4-butanediol or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, and the softness index (SI) represented by the following Equation 1 is 90 to 130.

The biodegradable polyester film may have a thickness of 5 μm to 200 μm. For example, the thickness of the biodegradable polyester film may be 5 μm to 180 μm, 5 μm to 160 μm, 10 μm to 150 μm, 15 μm to 130 μm, 20 μm to 100 μm, 25 μm to 80 μm, or 25 μm to 60 μm.

The physical properties such as tensile strength, elongation, coefficient of static friction, and tear strength of the biodegradable polyester film may satisfy the ranges described above in the biodegradable polyester resin.

The biodegradable polyester film may be prepared using the biodegradable polyester resin or polyester resin pellets.

Specifically, the process for preparing a biodegradable polyester film may comprise a first step of mixing a diol component and an aromatic dicarboxylic acid and pretreating it to obtain a slurry; a second step of subjecting a mixture comprising the slurry and an aliphatic dicarboxylic acid; or a mixture of a reaction product obtained by esterification of the slurry and an aliphatic dicarboxylic acid to an esterification reaction at least once to obtain a prepolymer; a third step of subjecting the prepolymer to a polycondensation reaction; a fourth step of preparing pellets from the polymer; and a fifth step of drying and melt-extruding the pellets.

Details on the first step to the fourth step are as described above.

In the fifth step, the drying may be carried out at 60° C. to 100° C. for 2 hours to 12 hours. Specifically, the drying may be carried out at 65° C. to 95° C., 70° C. to 90° C., or 75° C. to 85° C., for 3 hours to 12 hours or 4 hours to 10 hours. As the drying process conditions of the pellets satisfy the above ranges, it is possible to further enhance the quality of the biodegradable polyester film or molded article thus produced.

Upon completion of the drying, the moisture content may be 500 ppm or less, 400 ppm or less, 350 ppm or less, or 300 ppm or less.

In the fifth step, the melt-extrusion may be carried out at a temperature of 270° C. or lower. For example, the melt-extrusion may be carried out at a temperature of 265° C. or lower, 260° C. or lower, 255° C. or lower, 150° C. to 270° C., 150° C. to 255° C., or 150° C. to 240° C. The melt-extrusion may be carried out by a blown film process.

According to an embodiment of the present invention, as the biodegradable polyester film satisfies the specific structure and the specific ranges of physical properties of the biodegradable polyester resin, it is possible to achieve excellent physical properties, biodegradability, and water degradability even if inorganic substances and other additives are added in an amount less than that commonly used in the production of the biodegradable polyester film.

For example, when the biodegradable polyester film is prepared, the inorganic substances may be added in a less amount than that commonly used, for example, about 20% by weight, to achieve equivalent or better physical properties.

In addition, when the biodegradable polyester film is prepared, it is possible to achieve equivalent or better physical properties, biodegradability, and water degradability without the addition of inorganic substances or other additives.

Biodegradable Polyester Molded Article

In an embodiment of the present invention, a biodegradable polyester molded article may be prepared from the biodegradable polyester resin.

Specifically, the molded article may be prepared by molding the biodegradable polyester resin by a method known in the art such as extrusion and injection. The molded article may be an injection molded article, an extrusion molded article, a thin layer molded article, or a blow molded article, but it is not limited thereto.

For example, the molded article may be in the form of a film or sheet that can be used as agricultural mulching films, disposable gloves, disposable films, disposable bags, food packaging materials, or garbage bags, in the form of a fiber that can be used as fabrics, knitted fabrics, nonwoven fabrics, or ropes, or in the form of a container that can be used as a container for food packaging such as a lunch box. In addition, the molded article may be a molded article of various types such as disposable straws, spoons, food plates, and forks.

In particular, the molded article may be prepared from the biodegradable polyester resin, which can enhance the strength and processability, as well as, particularly, durability such as hydrolysis resistance. Thus, it can show excellent properties when applied to packaging materials for products stored and transported at low temperatures, automotive interior materials that require durability, or garbage bags, mulching films, and disposable products that require excellent durability and elongation.

Embodiments for Carrying Out the Invention

Hereinafter, the present invention is explained in detail by the following Examples. However, these examples are provided only for illustration purposes, and the present invention is not limited thereto.

EXAMPLE

Example 1

Preparation of a Biodegradable Polyester Resin

Step 1: Pretreatment to Obtain a Slurry 1,4-Butanediol (1,4-BDO) and terephthalic acid (TPA) were mixed at a molar ratio (1,4-BDO:TPA) of 1:1, which was then charged to a slurry tank (provided with an anchor type at the bottom, a height to the agitator of 30 mm, and three rotor blades) in a state without a catalyst. Here, terephthalic acid (TPA) had a D50 of 50 μm and a standard deviation (SD) of the D50 of 40.

Then, the mixture was pretreated by agitating it at 70° C. and 150 rpm for 30 minutes, thereby obtaining a slurry without phase separation.

Step 2: Preparation of a Prepolymer

The slurry obtained in step 1 was introduced into a reactor through a supply line, and 200 ppm of tetrabutyl titanate (Tyzor TnBT, Dupont) as a titanium-based catalyst was added thereto. A first esterification reaction was then carried out at 230° C. and atmospheric pressure for about 2 hours until 95% of water as a by-product was discharged.

Added to the reaction product were 48% by mole of 1,4-butanediol (1,4-BDO) based on the total number of moles of diol components, 48% by mole of adipic acid (AA) based on the total number of moles of dicarboxylic acid components, and 150 ppm of tetrabutyl titanate (Tyzor TnBT, Dupont) as a titanium-based catalyst based on the total weight of the diol, aromatic dicarboxylic acid, and aliphatic dicarboxylic acid. A second esterification reaction was then carried out at 210° C. and atmospheric pressure for about 2 hours until 95% of water, a by-product, was discharged, thereby obtaining a prepolymer having a number average molecular weight of 5,000 g/mole.

Step 3: Polycondensation Reaction 150 ppm of tetrabutyl titanate (Tyzor TnBT, Dupont) as a titanium-based catalyst and 500 ppm of triethyl phosphate stabilizer based on the total weight of the diol, aromatic dicarboxylic acid, and aliphatic dicarboxylic acid were added to the prepolymer obtained in step 2, which was stabilized for about 10 minutes. Thereafter, the reaction mixture was heated to 250° C., and a polycondensation reaction was carried out at 0.5 Torr for 4 hours to prepare a polymer having a number average molecular weight of 50,000 g/mole. It was cooled to 5° C. and cut with a pellet cutter to obtain biodegradable polyester resin pellets.

Preparation of a Biodegradable Polyester Sheet

Two Teflon sheets were prepared. A stainless steel (SUS) frame (area of 12 cm×12 cm) was placed on one Teflon sheet, and about 7 g of the polyester resin pellets prepared above was put in the stainless steel (SUS) frame (area of 12 cm×12 cm), which was covered with another Teflon sheet. It was placed in the center of a hot press (manufacturer: WithLab, model name: WL 1600SA) having an area of about 25 cm×25 cm. It was maintained at about 210° C. under a pressure of about 10 MPa for about 3 minutes and then taken out. It was immediately cooled in water at about 20° C. for about 30 seconds, thereby preparing a biodegradable polyester sheet having an area of about 10 cm×10 cm and a thickness of about 300 µm.

Preparation of a Biodegradable Polyester Film

The biodegradable polyester resin pellets were dried at 80° C. for 5 hours and then melt-extruded at 160° C. using a blown film extruder (Blown Film Extrusion Line, manufacturer: Eugene Engineering) to prepare a biodegradable polyester film having a thickness of 50 µm.

Example 2

A biodegradable polyester resin, a biodegradable polyester sheet, and a biodegradable polyester film were prepared in the same manner as in Example 1, except that the amounts of 1,4-butanediol (1,4-BDO), terephthalic acid (TPA), and adipic acid (AA) were changed, that terephthalic acid (TPA) having a standard deviation (SD) of 70 of the D50 of the TPA was used, and that 2,000 ppm of cellulose nanocrystal (CNC) (a particle diameter of 190 nm) treated for 15 minutes at 2,000 rpm with an agitator was further added when 1,4-butanediol (1,4-BDO) and adipic acid (AA) were added, as shown in Table 1 below.

Example 3

A biodegradable polyester resin, a biodegradable polyester sheet, and a biodegradable polyester film were prepared in the same manner as in Example 1, except that dimethyl terephthalate (DMT) was used instead of terephthalic acid (TPA) and that the amount of each raw material was changed, as shown in Table 1 below.

Example 4

Step 1: Pretreatment to Obtain a Slurry

54% by mole of 1,4-butanediol (1,4-BDO) based on the total number of moles of diol components and 54% by mole of terephthalic acid (TPA) based on the total number of moles of dicarboxylic acid components were mixed, which was then charged to a slurry tank (provided with an anchor type at the bottom, a height to the agitator of 15 mm, and two rotor blades) in a state without a catalyst. Terephthalic acid (TPA) had a D50 of 100 µm and a standard deviation (SD) of the D50 of 50.

Then, the mixture was pretreated by agitating it at 80° C. and 180 rpm for 15 minutes, thereby obtaining a slurry without phase separation.

Step 2: Preparation of a Prepolymer

Added to the slurry obtained in step 1 were 46% by mole of 1,4-butanediol (1,4-BDO) based on the total number of moles of diol components, 46% by mole of adipic acid (AA) based on the total number of moles of dicarboxylic acid components, and 300 ppm of tetrabutyl titanate (Tyzor TnBT, Dupont) as a titanium-based catalyst based on the total weight of the diol, aromatic dicarboxylic acid, and aliphatic dicarboxylic acid. An esterification reaction was then carried out at 230° C. and atmospheric pressure for about 3 hours until 95% of water as a by-product was discharged, thereby obtaining a prepolymer having a number average molecular weight of 4,000 g/mole.

Step 3: Polycondensation Reaction 150 ppm of tetrabutyl titanate (Tyzor TnBT, Dupont) as a titanium-based catalyst based on the total weight of the diol, aromatic dicarboxylic acid, and aliphatic dicarboxylic acid was added to the prepolymer obtained in step 2, which was heated to 255° C., and a polycondensation reaction was carried out at 0.5 Torr for 4 hours to prepare a polymer having a number average molecular weight of about 55,000 g/mole. It was cooled to 5° C. and cut with a pellet cutter to obtain biodegradable polyester resin pellets.

Preparation of a Biodegradable Polyester Sheet and Film

Biodegradable polyester sheet and film were prepared in the same manner as in Example 1.

Example 5

A biodegradable polyester resin having a number average molecular weight of 58,000 g/mole, a biodegradable polyester sheet, and a biodegradable polyester film were prepared in the same manner as in Example 4, except that the amounts of 1,4-butanediol (1,4-BDO), terephthalic acid (TPA), and adipic acid (AA) were changed, that 1,000 ppm of cellulose nanocrystal (CNC) (particle diameter of 190 nm) treated for 15 minutes at 2,000 rpm with an agitator was further added in step 2 of Example 4, and that 200 ppm of tetrabutyl titanate (Tyzor TnBT, Dupont) as a titanium-based catalyst based on the total weight of the diol, aromatic dicarboxylic acid, and aliphatic dicarboxylic acid was added in step 3, which was heated to 240° C., as shown in Table 1 below.

Example 6

A biodegradable polyester resin, a biodegradable polyester sheet, and a biodegradable polyester film were prepared in the same manner as in Example 1, except that the amounts of 1,4-butanediol (1,4-BDO), terephthalic acid (TPA), and adipic acid (AA) were changed and that terephthalic acid (TPA) having a standard deviation (SD) of 20 of the D50 of the TPA was used, as shown in Table 1 below.

Example 7

A biodegradable polyester resin, a biodegradable polyester sheet, and a biodegradable polyester film were prepared in the same manner as in Example 6, except that 600 ppm of cellulose nanocrystal (CNC) (particle diameter of 190 nm) treated for 15 minutes at 2,000 rpm with an agitator was further added when 1,4-butanediol (1,4-BDO) and adipic acid (AA) were added as shown in Table 1 below.

Comparative Example 1

A biodegradable polyester resin having a number average molecular weight of about 43,000 g/mole, a biodegradable polyester sheet, and a biodegradable polyester film were prepared in the same manner as in Example 4, except that step 1 (pretreatment step) of Example 4 was not carried out, that the amounts of terephthalic acid (TPA) and adipic acid (AA) were changed, and that TPA having a different D50 and a different standard deviation (SD) was used, as shown in Table 1 below.

Comparative Example 2

A biodegradable polyester resin having a number average molecular weight of about 43,000 g/mole was prepared in the same manner as in Comparative Example 1, except that the amounts of terephthalic acid (TPA) and adipic acid (AA) were changed and that TPA having a different D50 and a different standard deviation (SD) was used, as shown in Table 1 below.

A biodegradable polyester sheet was prepared in the same manner as in Example 1.

In addition, the biodegradable polyester resin and calcium carbonate were mixed at a ratio of 6:4, which was then melt-extruded at 190° C. using a blown film extruder (Blown Film Extrusion Line, manufacturer: Eugene Engineering) to prepare a biodegradable polyester film having a thickness of 50 μm.

Comparative Example 3

A biodegradable polyester resin having a number average molecular weight of about 30,000 g/mole, a biodegradable polyester sheet, and a polyester film were prepared in the same manner as in Example 1, except that step 1 (pretreatment step) of Example 1 was not carried out, that the amounts of terephthalic acid (TPA) and adipic acid (AA) were changed, and that TPA having a different D50 and a different standard deviation (SD) was used, as shown in Table 1 below.

Comparative Example 4

A biodegradable polyester resin having a number average molecular weight of about 42,000 g/mole, a biodegradable polyester sheet, and a polyester film were prepared in the same manner as in Comparative Example 1, except that the amounts of terephthalic acid (TPA) and adipic acid (AA) were changed and that TPA having a different D50 and a different standard deviation (SD) was used, as shown in Table 1 below.

TABLE 1

| | | Ex. 1 | Ex. 2 | Ex. 3 | Ex. 4 | Ex. 5 | Ex. 6 | Ex. 7 | C. Ex. 1 | C. Ex. 2 | C. Ex. 3 | C. Ex. 4 |
|---|---|---|---|---|---|---|---|---|---|---|---|---|
| | 1,4-BDO (% by mole) | 52 + 48 | 50 + 50 | 44 + 56 | 54 + 46 | 50 + 50 | 58 + 42 | 58 + 42 | 100 | 100 | 100 | 100 |
| | DMT or TPA (% by mole) | TPA 52 | TPA 50 | DMT 44 | TPA 54 | TPA 50 | TPA 58 | TPA 58 | TPA 42 | TPA 43 | TPA 39 | TPA 65 |
| | Adipic acid (% by mole) | 48 | 50 | 56 | 46 | 50 | 42 | 42 | 58 | 57 | 61 | 35 |
| | CNC (ppm) | | 2,000 | | | 1,000 | | 600 | | | | |
| Resin | Number of first repeat unit (X) | 459 | 539 | 854 | 502 | 480 | 359 | 359 | 343 | 313 | 70 | 273 |
| | Number of second repeat unit (Y) | 460 | 585 | 1,064 | 464 | 521 | 260 | 260 | 511 | 446 | 130 | 147 |
| | X/Y | 0.998 | 0.921 | 0.803 | 1.082 | 0.921 | 1.380 | 1.380 | 0.671 | 0.702 | 0.538 | 1.857 |
| Process | Pretreatment | ○ | ○ | ○ | ○ | ○ | ○ | ○ | X | X | X | X |
| | First esterification reaction | ○ | ○ | ○ | ○ | ○ | ○ | ○ | ○ | ○ | ○ | ○ |
| | Second esterification reaction | ○ | ○ | ○ | X | X | ○ | ○ | X | X | ○ | ○ |
| | D50 of DMT or TPA (μm) | 50 | 50 | 100 | 100 | 150 | 50 | 50 | 550 | 150 | 400 | 400 |
| | SD of DMT or TPA | 40 | 70 | 90 | 50 | 50 | 20 | 20 | 110 | 50 | 150 | 150 |

EVALUATION EXAMPLE

Evaluation Example 1: Average Particle Diameter (D50) and Standard Deviation <Average Particle Diameter (D50) and Standard Deviation of the Aromatic Dicarboxylic Acid>

The aromatic dicarboxylic acid (TPA or DMT) was measured for the average particle diameter (D50) in a particle size distribution (PSD) by a particle size analyzer Microtrac S3500 (Microtrac Inc.) and a standard deviation thereof under the following conditions.

Environment for Use

Temperature: 10 to 35° C., humidity: 90% RH, non-condensing maximum

D50 as an average particle size distribution for each section and SD were measured.

The standard deviation refers to the square root of variance and may be calculated using a software.

<Particle Diameter of the Nanocellulose>

The nanocellulose was subjected to measurement of particle size and particle size deviation through dynamic light scattering (DLS) at a temperature of 25° C. and a measurement angle of 175° using Zetasizer Nano ZS (manufacturer: Marven). Here, the value of the peak derived through the polydispersity index (PdI) in the confidence interval of 0.5 was taken as the particle size.

Evaluation Example 2: Crystallization Temperature (Tc) and ΔHmc

In a differential scanning calorimeter, the temperature was elevated from 40° C. to 180° C. at a rate of 10° C./minute, isothermal was performed for 5 minutes to first remove the thermal history, the temperature was then lowered from 180° C. to −50° C. at a rate of 10° C./minute, and isothermal was performed for 5 minutes as a second cooling procedure.

The crystallization temperature (Tc) and ΔHmc (J/g) were measured in the secondary cooling procedure.

Evaluation Example 3: Vicat A50 (VST)

The temperature (° C.) was measured when the tip of a needle passed through 1 mm of biodegradable chips (specimen) prepared in the Examples and Comparative Examples and having a thickness of 5 mm and a width of 10 mm while the specimen was measured at 50° C./hour and a load of 10 N according to ASTM D1525 (ISO 306).

Test Example 4: Friction Coefficient

Biodegradable polyester sheet specimens prepared in the Examples or Comparative Examples were each measured for the coefficient of static friction using a friction coefficient tester (QM110CF) of Qmesys.

The coefficient of static friction was measured as one surface of a specimen of a biodegradable polyester sheet prepared in the Examples or Comparative Examples was brought into contact with stainless steel (SUS) and then slid according to ASTM D1894.

Evaluation Example 5: Tensile Strength and Elongation at Break

The biodegradable polyester sheets prepared in the Examples or Comparative Examples were each cut to prepare a specimen in accordance with ASTM D638 V-type. The tensile strength (kgf/mm$^2$=9.8 MPa) and elongation at break (%) were measured using a universal testing machine (UTM, model name 4206-001) of INSTRON at a tensile speed of 100 mm/minute and calculated by the program built in the equipment.

Evaluation Example 6: Tear Strength

The biodegradable polyester sheets prepared in the Examples or Comparative Examples were each cut to prepare a specimen in accordance with KSM 6518-B, and a 2-mm notch was made in its center. The tear strength was then measured using a universal testing machine (UTM, model name 4206-001) of INSTRON and calculated according to the following Equation 6.

$$\text{Tear strength} = \text{force applied when a specimen is torn (N)/thickness of the specimen (cm)} \quad \text{[Equation 6]}$$

Evaluation Example 7: Softness Index (SI) and Molding Index (FI)

The softness index (SI) represented by the following Equation 1 was calculated using the Tc and VST values measured in Evaluation Examples 2 and 3:

$$\text{Softness index (SI)} = Tc(° \text{C.})/100 + VST(° \text{C.}) \quad \text{[Equation 1]}$$

In Equation 1, Tc and VST are values, exclusive of units, measured for a specimen of the biodegradable polyester film prepared from the biodegradable polyester resin.

Tc is the crystallization temperature (° C.) measured using a differential scanning calorimeter (DSC) while the temperature is elevated from 40° C. to 180° C. at a rate of 10° C./minute and then lowered to −50° C. at a rate of 10° C./minute.

VST is the temperature (° C.) when the tip of a needle passes through 1 mm of a specimen having a thickness of 5 mm and a width of 10 mm while the specimen is measured at 50° C./hour and a load of 10 N according to ASTM D1525.

In addition, the molding index (FI) represented by the following Equation 2 was calculated using the values of the coefficient of static friction and tear strength measured in Evaluation Examples 4 and 6:

$$\text{Molding index } (FI) = TS/FC \quad \text{[Equation 2]}$$

In Equation 2, TS and FC are values, exclusive of units, measured for a specimen of a biodegradable polyester sheet prepared from the biodegradable polyester resin.

TS is the tear strength (N/cm) measured using a universal testing machine (UTM) for a specimen that has been made according to KSM 6518-B.

FC is the coefficient of static friction measured by contacting one surface of the specimen with stainless steel (SUS) according to ASTM D1894.

Evaluation Example 8: Storage Modulus, Loss Modulus, and Loss Tangent (tan δ)

Biodegradable polyester sheet specimens prepared in the Examples or Comparative Examples were each measured for the storage modulus and loss modulus using a rheometrics dynamic spectrometer (RDS; TA Instrument, Discovery HR 30), a dynamic viscoelasticity tester.

In addition, the loss tangent (tan δ) represented by the following Equation 3 was calculated using the values of the storage modulus and loss modulus:

Loss tangent (tan δ)=$G''/G'$  [Equation 3]

In Equation 3, G' is the storage modulus of a biodegradable polyester sheet prepared from the biodegradable polyester resin at 240° C. and a frequency of 5 rad/s in dynamic viscoelasticity measurement, and G" is the loss modulus of the biodegradable polyester sheet prepared from the biodegradable polyester resin at 240° C. and a frequency of 5 rad/s in dynamic viscoelasticity measurement.

Evaluation Example 9: Water Degradability Reduction Rate

The biodegradable polyester sheets prepared in the Examples and Comparative Examples were each immersed in water (100% R.H) at 80° C., and a water degradation acceleration test was conducted.

Specifically, 5 g of the polyester sheets of the Examples and Comparative Examples were each put in 500 ml of deionized water (DI Water), which was covered with a stopper to prevent water from evaporating. Then, a water degradation acceleration test was conducted in a convection (hot air) oven at 80° C. The humidity environment of the biodegradable polyester sheet was the same as proceeding at 100% R.H because it was immersed in water.

The number average molecular weight of the biodegradable polyester sheet after 3 months was compared with the initial number average molecular weight as represented by the following Equation 4 using gel permeation chromatography (GPC).

$$\text{Water degradability reduction rate(\%)} = \frac{Mn_A - Mn_B}{Mn_A} \times 100 \quad \text{[Equation 4]}$$

In Equation 4, $Mn_A$ and $Mn_B$ are each a number average molecular weight of a biodegradable polyester sheet prepared from the biodegradable polyester resin as measured using gel permeation chromatography (GPC) in which the biodegradable polyester sheet is immersed in water and subjected to water degradation acceleration at 80° C. in a hot air oven.

$Mn_A$ is the initial number average molecular weight of the biodegradable polyester sheet, and $Mn_B$ is the number average molecular weight of the biodegradable polyester sheet after 3 months of the water degradation acceleration.

Evaluation Example 10: Biodegradability

The biodegradability was calculated by measuring the amount of carbon dioxide generated according to KS M3100-1. Specifically, an inoculum container having compost only manufactured in a compost factory was prepared. A test container in which a specimen in 5% by weight of the dry weight of the compost had been added was prepared. Thereafter, they were cultivated for 180 days under the conditions of a temperature of 58±2° C., a moisture content of 50%, and an oxygen concentration of 6% or more. Carbon dioxide generated in each container was collected and titrated with an aqueous solution of phenolphthalein to measure the amount of carbon dioxide generated. The biodegradability was calculated from the measured amount of generated carbon dioxide according to the following Equation 5.

Biodegradability (%)={(amount of $CO_2$ generated in a test container)−(amount of $CO_2$ generated in an inoculum container)}×100/(theoretical amount of $CO_2$ generated in the test container)  [Equation 5]

Evaluation Example 11: Blow Moldability and Stickiness

The blow moldability was evaluated at a temperature of 160° C. in a blow molding machine by blowing air from the bottom and observing bubble formation, as follows:

○: A bubble was neither stretched to one side to be oblique nor burst.

x: A bubble was not properly shaped, stretched to one side to be oblique, or burst. The moldability was not good.

Meanwhile, when the biodegradable polyester film was prepared, the stickiness was evaluated by observing the degree of stickiness between the surfaces during winding:

○: The surfaces were stuck to each other during winding and were not detached.

Δ: The surfaces were stuck to each other during winding, but were easily detached.

x: The surfaces were not stuck to each other during winding.

TABLE 2

|  | Ex. 1 | Ex. 2 | Ex. 3 | Ex. 4 | Ex. 5 | Ex. 6 | Ex. 7 | C. Ex. 1 | C. Ex. 2 | C. Ex. 3 | C. Ex. 4 |
| --- | --- | --- | --- | --- | --- | --- | --- | --- | --- | --- | --- |
| Biodegradability (%) | 90 | 90 | 90 | 90 | 90 | 90 | 90 | 90 | 90 | 90 | 90 |
| Water degradability reduction rate (%) | 90 | 91 | 91 | 88 | 90 | 86 | 88 | 94 | 90 | 90 | 70 |
| Tc (° C.) | 47 | 58 | 44 | 40 | 47 | 55 | 60 | 34 | 36 | 31 | 65 |
| ΔHmc (J/g) | 17.0 | 18.5 | 15.8 | 15 | 18.1 | 19.0 | 19.3 | 15.5 | 15.6 | 12.2 | 20.0 |
| Vicat A50 (VST, ° C.) | 102 | 108 | 100 | 94 | 96 | 115 | 126 | 88 | 89 | 79 | 131 |
| Static friction coefficient | 8.9 | 9.0 | 9.1 | 9.4 | 9.3 | 8.7 | 8.5 | 12.5 | 9 | 13.2 | 8.4 |
| Tensile strength (MPa) | 35 | 46 | 40 | 37 | 42 | 47 | 49 | 28 | 25 | 22 | 29 |
| Elongation (%) | 250 | 380 | 300 | 270 | 330 | 380 | 390 | 300 | 100 | 300 | 150 |

TABLE 2-continued

|  | Ex. 1 | Ex. 2 | Ex. 3 | Ex. 4 | Ex. 5 | Ex. 6 | Ex. 7 | C. Ex. 1 | C. Ex. 2 | C. Ex. 3 | C. Ex. 4 |
|---|---|---|---|---|---|---|---|---|---|---|---|
| Tear strength (N/cm) | 385 | 430 | 395 | 305 | 400 | 430 | 450 | 290 | 180 | 700 | 150 |
| Softness index (SI) | 102.47 | 108.58 | 100.44 | 94.40 | 96.47 | 115.55 | 126.66 | 88.34 | 89.36 | 79.31 | 131.65 |
| Molding index (FI) | 43.26 | 47.78 | 43.41 | 32.45 | 43.01 | 49.4 | 52.9 | 23.20 | 20.00 | 53.03 | 17.8 |
| G' (dyne/cm$^2$) | 318,760 | 275,630 | 203,820 | 308,009 | 299,729 | 277,500 | 273,400 | 367,520 | 422,600 | 224,540 | 304,200 |
| G" (dyne/cm$^2$) | 368,090 | 329,360 | 242,545 | 357,290 | 350,672 | 300,400 | 301,200 | 433,674 | 498,668 | 289,448 | 265,310 |
| Tan δ (G"/G') | 1.15 | 1.19 | 1.19 | 1.16 | 1.17 | 1.08 | 1.1 | 1.18 | 1.18 | 1.29 | 0.87 |
| Blow moldability | ○ | ○ | ○ | ○ | ○ | ○ | ○ | X | X | X | X |
| Adhesiveness | X | X | X | X | X | X | X | ○ | Δ | ○ | Δ |

As shown in Table 2 above, the biodegradable polyester resins of the Examples, which satisfied both the ratio (X/Y) of the number of the first repeat unit to the number of the second repeat unit and the softness index in the specific ranges, were overall excellent in physical properties and processability and, at the same time, were excellent in biodegradability and water degradability reduction rate after 3 months.

Specifically, the biodegradable polyester resins of Examples 1 to 7 had crystallization temperature (Tc), ΔHmc, and Vicat A50 satisfying the ranges for enhancing the moldability. They were enhanced in static friction coefficient, strength, elongation, and tearing strength, as well as improved in blow moldability and stickiness, leading to excellent processability. In addition, the biodegradable polyester sheets or films prepared from the biodegradable polyester resins had a biodegradability of 90% or more and a water degradability reduction rate after 3 months of 86% or more.

In contrast, the biodegradable polyester resins of Comparative Examples 1 to 4 had crystallization temperature (Tc), ΔHmc, Vicat A50, static friction coefficient, strength, elongation, or tearing strength lower than those of Examples 1 to 7. In particular, the biodegradable polyester resin of Comparative Example 4 had an excessively high softness index, a very low water degradability reduction rate after 3 months of 70%, and poor blow moldability and stickiness.

In addition, the biodegradable polyester resin of Comparative Example 3 or 4, which did not satisfy the ratio of the number of the first repeat unit comprising a first diol residue and an aromatic dicarboxylic acid residue to the number of the second repeat unit comprising a second diol residue and an aliphatic dicarboxylic acid residue, had a softness index and a molding index in inappropriate ranges with poor strength, blow moldability, and stickiness.

In particular, the biodegradable polyester resins of Examples 1 to 5, which had a ratio (X/Y) of the number of the first repeat unit to the number of the second repeat unit of about 0.8 to 1.3, had an appropriate softness index of 90 to 110, with a water degradability reduction rate after 3 months enhanced to some extent, as compared with the biodegradable polyester resins of Examples 6 and 8, which had a ratio (X/Y) of the number of the first repeat unit to the number of the second repeat unit of greater than 1.3.

Meanwhile, it was confirmed that the addition of nanocellulose had an impact on the physical properties of the biodegradable polyester resin or the biodegradable polyester sheet or film prepared from the same.

Specifically, in Examples 2, 5, and 7 in which nanocellulose was added, the physical properties such as elongation, tensile strength, and tear strength were enhanced.

Meanwhile, it was confirmed that the process conditions of the biodegradable polyester resin had an impact on the physical properties of the biodegradable polyester resin or the biodegradable polyester sheet or film prepared from the same.

Specifically, the biodegradable polyester resins of Examples 1 to 3 prepared through the first and second esterification reactions were advantageous for achieving a softness index and a molding index in appropriate ranges, along with an enhanced water degradability reduction rate after 3 months, as compared with the biodegradable polyester resins of Examples 4 and 5 prepared through the first esterification reaction alone.

Further, the biodegradable polyester resin of Comparative Example 3 prepared through the first and second esterification reactions without slurry pretreatment had a very low softness index of 79.31 and a very high molding index of 53.03, as compared with the biodegradable polyester resins of the Examples in which the slurry pretreatment had been carried out. In addition, it had a very low tensile strength of 22 MPa, a very high coefficient of static friction of 13.2, and very poor blow moldability and stickiness.

The invention claimed is:

1. A biodegradable polyester resin, which comprises a first repeat unit comprising a first diol residue and an aromatic dicarboxylic acid residue and a second repeat unit comprising a second diol residue and an aliphatic dicarboxylic acid residue,
   wherein the first and second diol residues each comprise a residue of 1,4-butanediol, 1,2-ethanediol, 1,3-propanediol, or a derivative thereof,
   the aromatic dicarboxylic acid residue comprises a residue of terephthalic acid, dimethyl terephthalate, or a derivative thereof,
   the aliphatic dicarboxylic acid residue comprises a residue of adipic acid, succinic acid, sebacic acid, or a derivative thereof,
   the ratio (X/Y) of the number (X) of the first repeat unit to the number (Y) of the second repeat unit is 0.6 to 1.8,
   the number of the first repeat unit is 100 to 900,
   the number of the second repeat unit is 100 to 1,100, and the softness index (SI) represented by the following Equation 1 is 90 to 130:

Softness index $(SI)=Tc(° C.)/100+VST(° C.)$ [Equation 1]

in Equation 1, Tc and VST are values, exclusive of units, measured for a specimen of a biodegradable polyester film prepared from the biodegradable polyester resin, Tc is the crystallization temperature (° C.) measured using a differential scanning calorimeter (DSC) while the temperature is elevated from 40° C. to 180° C. at a rate of 10° C./minute and then lowered to −50° C. at a rate of 10° C./minute, and VST is the temperature (° C.) when the tip of a needle passes through 1 mm of a specimen having a thickness of 5 mm and a width of 10 mm while the specimen is measured at 50° C./hour and a load of 10 N according to ASTM D1525.

2. The biodegradable polyester resin of claim 1, wherein the biodegradable polyester resin has a molding index (FI) of 25 to 53 represented by the following Equation 2:

Molding index $(FI)=TS/FC$ [Equation 2]

in Equation 2, TS and FC are values, exclusive of units, measured for a specimen of a biodegradable polyester sheet prepared from the biodegradable polyester resin, TS is the tear strength (N/cm) measured using a universal testing machine (UTM) for a specimen that has been made according to KSM 6518-B, and FC is the coefficient of static friction measured by contacting one surface of the specimen with stainless steel (SUS) according to ASTM D1894.

3. The biodegradable polyester resin of claim 2, wherein the crystallization temperature (Tc) is 38° C. or higher, VST is 90° C. or higher, FC is less than 10, and TS is 300 N/cm or more.

4. The biodegradable polyester resin of claim 1, wherein the biodegradable polyester resin has a loss tangent (tan δ) of greater than 1 represented by the following Equation 3:

Loss tangent $(\tan \delta)=G''/G'$ [Equation 3]

in Equation 3, G' is the storage modulus of a biodegradable polyester sheet prepared from the biodegradable polyester resin at 240° C. and a frequency of 5 rad/s in dynamic viscoelasticity measurement, and G" is the loss modulus of the biodegradable polyester sheet prepared from the biodegradable polyester resin at 240° C. and a frequency of 5 rad/s in dynamic viscoelasticity measurement.

5. The biodegradable polyester resin of claim 1, wherein a biodegradable polyester film comprising the biodegradable polyester resin has a biodegradability of 90% or more as measured by the amount of carbon dioxide generated according to KS M3100-1 and a water degradability reduction rate represented by the following Equation 4 of 85% or more:

$$\text{Water degradability reduction rate}(\%) = \frac{Mn_A - Mn_B}{Mn_A} \times 100 \quad \text{[Equation 4]}$$

in Equation 4, $Mn_A$ and $Mn_B$ are each a number average molecular weight of a biodegradable polyester sheet prepared from the biodegradable polyester resin as measured using gel permeation chromatography (GPC) in which the biodegradable polyester sheet is immersed in water and subjected to water degradation acceleration at 80° C. in a hot air oven, $Mn_A$ is the initial number average molecular weight of the biodegradable polyester sheet, and $Mn_B$ is the number average molecular weight of the biodegradable polyester sheet after 3 months of the water degradation acceleration.

6. The biodegradable polyester resin of claim 1, wherein the aromatic dicarboxylic acid comprises terephthalic acid, and the terephthalic acid has an average particle diameter (D50) of 10 μm to 400 μm in a particle size distribution (PSD) measured by a particle size analyzer Microtrac S3500 and a standard deviation of the average particle diameter (D50) of 100 or less.

7. The biodegradable polyester resin of claim 1, wherein the biodegradable polyester resin comprises at least one nanocellulose selected from the group consisting of cellulose nanocrystal, cellulose nanofiber, microfibrillated cellulose, hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose, and cyclohexyl cellulose.

8. A process for preparing a biodegradable polyester resin, which comprises:

a first step of mixing a diol component and an aromatic dicarboxylic acid and pretreating it to obtain a slurry;

a second step of subjecting a mixture comprising the slurry and an aliphatic dicarboxylic acid; or a mixture of a reaction product obtained by esterification of the slurry and an aliphatic dicarboxylic acid to an esterification reaction at least once to obtain a prepolymer; and a third step of subjecting the prepolymer to a polycondensation reaction, wherein the biodegradable polyester resin comprises a first repeat unit comprising a first diol residue and an aromatic dicarboxylic acid residue and a second repeat unit comprising a second diol residue and an aliphatic dicarboxylic acid residue, the first and second diol residues each comprise a residue of 1,4-butanediol, 1,2-ethanediol, 1,3-propanediol, or a derivative thereof, the aromatic dicarboxylic acid residue comprises a residue of terephthalic acid, dimethyl terephthalate, or a derivative thereof, the aliphatic dicarboxylic acid residue comprises a residue of adipic acid, succinic acid, sebacic acid, or a derivative thereof, the ratio (X/Y) of the number (X) of the first repeat unit to the number (Y) of the second repeat unit is 0.6 to 1.8, the number of the first repeat unit is 100 to 900, the number of the second repeat unit is 100 to 1,100, and the softness index (SI) represented by the following Equation 1 is 90 to 130:

Softness index $(SI)=Tc(° C.)/100+VST(° C.)$ [Equation 1]

in Equation 1, Tc and VST are values, exclusive of units, measured for a specimen of a biodegradable polyester film prepared from the biodegradable polyester resin, Tc is the crystallization temperature (° C.) measured using a differential scanning calorimeter (DSC) while the temperature is elevated from 40° C. to 180° C. at a rate of 10° C./minute and then lowered to −50° C. at a rate of 10° C./minute, and VST is the temperature (° C.) when the tip of a needle passes through 1 mm of a specimen having a thickness of 5 mm and a width of 10 mm while the specimen is measured at 50° C./hour and a load of 10 N according to ASTM D1525.

9. A biodegradable polyester film, which comprises a biodegradable polyester resin, wherein the biodegradable polyester resin comprises a first repeat unit comprising a first diol residue and an aromatic dicarboxylic acid residue and a second repeat unit comprising a second diol residue and an aliphatic dicarboxylic acid residue,

- the first and second diol residues each comprise a residue of 1,4-butanediol, 1,2-ethanediol, 1,3-propanediol, or a derivative thereof,
- the aromatic dicarboxylic acid residue comprises a residue of terephthalic acid, dimethyl terephthalate, or a derivative thereof,
- the aliphatic dicarboxylic acid residue comprises a residue of adipic acid, succinic acid, sebacic acid, or a derivative thereof,
- the ratio (X/Y) of the number (X) of the first repeat unit to the number (Y) of the second repeat unit is 0.6 to 1.8,
- the number of the first repeat unit is 100 to 900,
- the number of the second repeat unit is 100 to 1,100, and
- the softness index (SI) represented by the following Equation 1 is 90 to 130:

$$\text{Softness index (SI)} = Tc(° C.)/100 + VST(° C.) \quad \text{[Equation 1]}$$

in Equation 1, Tc and VST are values, exclusive of units, measured for a specimen of a biodegradable polyester film prepared from the biodegradable polyester resin, Tc is the crystallization temperature (° C.) measured using a differential scanning calorimeter (DSC) while the temperature is elevated from 40° C. to 180° C. at a rate of 10° C./minute and then lowered to −50° C. at a rate of 10° C./minute, and VST is the temperature (° C.) when the tip of a needle passes through 1 mm of a specimen having a thickness of 5 mm and a width of 10 mm while the specimen is measured at 50° C./hour and a load of 10 N according to ASTM D1525.

\* \* \* \* \*